(12) United States Patent
Suzuki et al.

(10) Patent No.: US 11,195,419 B2
(45) Date of Patent: Dec. 7, 2021

(54) NON-TRANSITORY COMPUTER-READABLE STORAGE MEDIUM FOR STORING DANGEROUS SPOT CALCULATION PROGRAM, DANGEROUS SPOT CALCULATION METHOD, AND DANGEROUS SPOT CALCULATION APPARATUS

(71) Applicant: FUJITSU LIMITED, Kawasaki (JP)

(72) Inventors: Hiroko Suzuki, Kawasaki (JP); Takahiro Saito, Asaka (JP); Isamu Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 176 days.

(21) Appl. No.: 16/589,207

(22) Filed: Oct. 1, 2019

(65) Prior Publication Data
US 2020/0035105 A1    Jan. 30, 2020

Related U.S. Application Data

(63) Continuation of application No. PCT/JP2017/015925, filed on Apr. 20, 2017.

(51) Int. Cl.
*G01S 13/91* (2006.01)
*G08G 3/02* (2006.01)
(Continued)

(52) U.S. Cl.
CPC .............. *G08G 3/02* (2013.01); *B63B 49/00* (2013.01); *G01C 21/20* (2013.01); *G01C 21/203* (2013.01);
(Continued)

(58) Field of Classification Search
CPC ......... G01S 13/91; G01S 13/917; G08G 9/02; G08G 3/00; G08G 3/02; B63B 51/00; G01C 21/20; G01C 21/34
(Continued)

(56) References Cited

U.S. PATENT DOCUMENTS 5,404,135 A * 4/1995 Janex ................ G08G 3/02
340/988
5,515,287 A * 5/1996 Hakoyama ............... G08G 3/02
701/301
(Continued)

FOREIGN PATENT DOCUMENTS

| CN | 103730031 | 4/2014 |
| CN | 106056978 | 10/2016 |

(Continued)

OTHER PUBLICATIONS

Feasibility Study for Predicting Collision Possibility Sea Area for Each Ship by Using Support Vector Machine; Tadatsugi Okazaki et al.; 22018 IEEE International Conference on Systems, Man, and Cybernetics (SMC); IEEE Conference Paper (year: 2018) (Year: 2018).*

(Continued)

*Primary Examiner* — Cuong H Nguyen
(74) *Attorney, Agent, or Firm* — Fujitsu Patent Center

(57) ABSTRACT

A method includes: extracting Time to Closest Point of Approach included in a predetermined time from "risk value information" that stores a "Closest Point of Approach", the "Time to Closest Point of Approach" and a "risk value" for "a first vessel and a second vessel", the risk value being a value indicating a possibility of collision between the first vessel and the second vessel at the Closest Point of Approach and the Time to Closest Point of Approach; acquiring the Closest. Point of Approach and the risk value corresponding to the extracted Time to Closest Point of Approach from the risk value information; determining to which sea area the acquired Closest. Point of Approach belongs to; and executing calculation processing that includes calculating a sum of risk values corresponding to
(Continued)

the Closest Point of Approach for each of sea areas to which the determined Closest Point of Approach belongs.

18 Claims, 19 Drawing Sheets

(51) Int. Cl.
*G08G 3/00* (2006.01)
*B63B 49/00* (2006.01)
*G01C 21/20* (2006.01)
*G08G 9/02* (2006.01)
*G01C 21/34* (2006.01)

(52) U.S. Cl.
CPC .............. *G01C 21/34* (2013.01); *G01S 13/91* (2013.01); *G01S 13/917* (2019.05); *G08G 9/02* (2013.01)

(58) Field of Classification Search
USPC ........... 701/21, 117, 301–302; 340/903, 984; 342/41
See application file for complete search history.

(56) References Cited

U.S. PATENT DOCUMENTS

| | | | |
|---|---|---|---|
| 7,082,355 B1* | 7/2006 | Jacobson | B63B 79/10 701/21 |
| 8,583,357 B2* | 11/2013 | Kita | G05D 1/02 701/300 |
| 9,865,167 B1* | 1/2018 | Liang | G08G 3/02 |
| 10,145,688 B2* | 12/2018 | Saito | G01S 5/0294 |
| 10,192,449 B2* | 1/2019 | Suzuki | G08G 3/02 |
| 10,948,300 B2* | 3/2021 | Wang | G01C 21/20 |
| 2003/0112171 A1* | 6/2003 | Michaelson | B63B 43/18 342/41 |
| 2011/0022316 A1* | 1/2011 | Bendito Vallori | G05D 1/0206 701/301 |
| 2011/0210865 A1* | 9/2011 | Lee | G08G 3/02 340/903 |
| 2012/0191335 A1* | 7/2012 | Kita | G08G 3/02 701/300 |
| 2012/0271538 A1* | 10/2012 | Lee | G08G 9/02 701/117 |
| 2016/0125739 A1* | 5/2016 | Stewart | G01C 21/203 701/21 |
| 2017/0067984 A1 | 3/2017 | Nakahama et al. | |
| 2017/0287340 A1* | 10/2017 | Suzuki | G08G 3/02 |
| 2017/0372431 A1* | 12/2017 | Perl | G07C 5/085 |
| 2018/0025644 A1* | 1/2018 | Jeong | G08G 3/02 701/300 |
| 2020/0035106 A1* | 1/2020 | Suzuki | G08G 3/02 |

FOREIGN PATENT DOCUMENTS

| | | |
|---|---|---|
| JP | H09-022500 A | 1/1997 |
| JP | 10-250681 | 9/1998 |
| JP | H11-272999 A | 10/1999 |
| JP | 2005-353032 A | 12/2005 |
| JP | 2009-25860 | 2/2009 |
| JP | 2009-037445 A | 2/2009 |
| JP | 2013-028296 | 2/2013 |
| JP | 2015-161987 A | 9/2015 |
| JP | 2017-054215 A | 3/2017 |
| KR | 2018010633 A * | 1/2018 |
| KR | 1900851 B1 * | 11/2018 |
| WO | 2011/027037 A1 | 3/2011 |

OTHER PUBLICATIONS

Collision avoidance of moving obstacles for ship with genetic algorithm; X.-M. Zeng;M. Ito;E. Shimizu; 6th International Workshop on Advanced Motion Control. Proceedings (Cat. No.00TH8494); IEEE Conference Paper (Year: 2000).*
Building an automatic control system of maneuvering ship in collision situation with genetic algorithms; Xiao-ming Zeng;M. Ito;E. Shimizu; Proceedings of the 2001 American Control Conference. (Cat. No.01CH37148); IEEE Conference Paper. (Year: 2001).*
A dynamic model for environmentally safe shipping through the Aegean Sea; by Koromila Ioanna et al; 2015 6th International Conference on Information, Intelligence, Systems and Applications (USA); IEEE Conference Paper. (Year: 2015).*
Automatic identification system-based approach for assessing the near-miss collision risk dynamics of ships in ports; Z Fang, H Yu, R Ke, SL Shaw et al; IEEE Transactions on Intelligent Transportation Systems—ieeexplore.ieee.org, (Year: 2018).*
Estimation of vessel collision frequency in the Yangtze River estuary considering dynamic ship domains; T Chai, J Weng, G Li—The Japan Society of Naval Architects and Ocean Engineers (JASNAOE) (Year: 2019).*
Modeling perceived collision risk in vessel encounter situations; JB Yim, DS Kim, DJ Park—Ocean Engineering, 2018—Elsevier (Year: 2018).*
Spatial correlation analysis of near ship collision hotspots with local maritime traffic characteristics; H Rong, AP Teixeira, CG Soares—Reliability Engineering & System Safety, 2021—Elsevier (Year: 2021).*
Macroscopic collision risk model based on near miss; Y Zhou, J Yang, X Bian, L Ma, Z Kang—The Journal of Navigation, 2021—cambridge.org (Year: 2021).*
Maritime navigation accidents and risk indicators: An exploratory statistical analysis using AIS data and accident reports; RJ Bye, AL Aalberg—Reliability Engineering & System Safety, 2018—Elsevier (Year: 2018).*
Ship encounter azimuth map division based on automatic identification system data and support vector classification; M Gao, GY Shi, J Liu—Ocean Engineering, 2020—Elsevier (Year: 2020).*
Evaluation of ship collision risk assessments using environmental stress and collision risk models; Y Yoo, JS Lee—Ocean Engineering, 2019—Elsevier (Year: 2019).*
EESR—The Extended European Search Report of European application No. 17905998.5 dated Apr. 6, 2020.
Makiko Minami et al., "Function of Vessel Accident Hazard Map to Reduce Marine Accidents", The 129th Presentation (Nov. 8 and 9, 2013) Japan Institute of Navigation, Presentation paper (preliminarily) vol. 1, No. 2, Oct. 3, 2013, pp. 174-177 (5 pages).
International Search Report and Written Opinion of the International Searching Authority (Form PCT/ISA/210, 220, and 237), mailed in connection with PCT/JP2017/015925 and dated Aug. 1, 2017 (15 pages).
JPOA—Office Action of Japanese Patent Application No. 2019-513171 dated Jun. 16, 2020 with Full Machine Translation. References cited in the JPOA were previously submitted in the IDS filed on Oct. 1, 2019.

* cited by examiner

FIG. 3

| GRID ID | GRID RANGE |
|---|---|
| 1 | (xx,xx)、(xx,xx)、(xx,xx)、(xx,xx) |
| 2 | (xx,xx)、(xx,xx)、(xx,xx)、(xx,xx) |
| ⋮ | ⋮ |

FIG. 4

| GRID ID | APPROACH ANGLE | EXIT ANGLE | VELOCITY DIFFERENCE | VESSEL ID |
|---|---|---|---|---|
| ... | | | | |
| (2,2) | 88 | 89 | Δ V1 | xxxxx1 |
| (2,2) | 90 | 89 | Δ V2 | xxxxx2 |
| (2,2) | 92 | 91 | Δ V3 | xxxxx3 |
| (2,2) | 93 | 93 | Δ V4 | xxxxx4 |
| ... | | | | |
| (2,2) | 265 | 266 | Δ V95 | xxxxx95 |
| (2,2) | 268 | 268 | Δ V96 | xxxxx96 |
| (2,2) | 270 | 269 | Δ V97 | xxxxx97 |
| (2,2) | 271 | 271 | Δ V98 | xxxxx98 |
| (2,2) | 271 | 272 | Δ V99 | xxxxx99 |
| ... | | | | |

FIG. 6A

INFORMATION REGARDING VESSEL 1 ~34

| TIME | MMSI | LATITUDE | LONGITUDE | SOG | COG | VESSEL LENGTH | VESSEL WIDTH |
|---|---|---|---|---|---|---|---|
| 2013/1/10 2:40 | 123456789 | 139.74 | 35.339 | 8.8556 | 19.478 | 96 | 15 |
| 2013/1/10 2:40 | 123456789 | 139.74 | 35.339 | 8.8556 | 19.478 | 96 | 15 |
| 2013/1/10 2:40 | 123456789 | 139.74 | 35.339 | 8.8556 | 19.478 | 96 | 15 |
| 2013/1/10 2:40 | 123456789 | 139.64 | 35.388 | 6.9778 | 26.811 | 74 | 12 |
| 2013/1/10 2:40 | 123456789 | 139.64 | 35.388 | 6.9778 | 26.811 | 74 | 12 |
| 2013/1/10 2:40 | 123456789 | 139.64 | 35.388 | 6.9778 | 26.811 | 74 | 12 |
| 2013/1/10 2:40 | 234567890 | 139.92 | 35.491 | 10.345 | 287.57 | 276 | 44 |
| 2013/1/10 2:40 | 234567890 | 139.92 | 35.491 | 10.345 | 287.57 | 276 | 44 |
| 2013/1/10 2:40 | 234567890 | 139.92 | 35.491 | 10.345 | 287.57 | 276 | 44 |
| 2013/1/10 2:40 | 234567890 | 139.83 | 35.556 | 13.8 | 127 | 285 | 40 |
| 2013/1/10 2:40 | 234567890 | 139.83 | 35.556 | 13.8 | 127 | 285 | 40 |
| ... | ... | ... | ... | ... | ... | ... | ... |

FIG. 6B

| | INFORMATION REGARDING VESSEL 2 | | | | | | | CPA | TCPA | RISK VALUE 1 | RISK VALUE 2 | TOTAL RISK VALUE ⌒34 |
|---|---|---|---|---|---|---|---|---|---|---|---|---|
| MMSI | LATITUDE | LONGITUDE | SOG | COG | VESSEL LENGTH | VESSEL WIDTH | | | | | | |
| 456789012 | 139.64 | 35.388 | 6.9778 | 26.811 | 74 | 12 | c011 | tc012 | r011 | r012 | R011 |
| 567890123 | 139.92 | 35.491 | 10.345 | 287.57 | 276 | 44 | c021 | tc022 | r021 | r022 | R012 |
| 789012345 | 139.83 | 35.556 | 13.8 | 127 | 285 | 40 | c031 | tc032 | r031 | r032 | R013 |
| 678901234 | 139.74 | 35.339 | 8.8556 | 19.478 | 96 | 15 | c041 | tc042 | r041 | r042 | R014 |
| 567890123 | 139.92 | 35.491 | 10.345 | 287.57 | 276 | 44 | c051 | tc052 | r051 | r052 | R015 |
| 789012345 | 139.83 | 35.556 | 13.8 | 127 | 285 | 40 | c061 | tc062 | r061 | r062 | R016 |
| 678901234 | 139.74 | 35.339 | 8.8556 | 19.478 | 96 | 15 | c071 | tc072 | r071 | r072 | R017 |
| 456789012 | 139.64 | 35.388 | 6.9778 | 26.811 | 74 | 12 | c081 | tc082 | r081 | r082 | R018 |
| 789012345 | 139.83 | 35.556 | 13.8 | 127 | 285 | 40 | c091 | tc092 | r091 | r092 | R019 |
| 678901234 | 139.74 | 35.339 | 8.8556 | 19.478 | 96 | 15 | c101 | tc102 | r101 | r102 | R020 |
| 456789012 | 139.64 | 35.388 | 6.9778 | 26.811 | 74 | 12 | c111 | tc112 | r111 | r112 | R21 |
| ... | ... | ... | ... | ... | ... | ... | ... | ... | ... | ... | ... |

FIG. 9

| GRID ID | CUMULATIVE TOTAL RISK VALUE |
|---------|------------------------------|
| 1 | R1 |
| 2 | R2 |
| ⋮ | ⋮ |

NON-TRANSITORY COMPUTER-READABLE
STORAGE MEDIUM FOR STORING
DANGEROUS SPOT CALCULATION
PROGRAM, DANGEROUS SPOT
CALCULATION METHOD, AND
DANGEROUS SPOT CALCULATION
APPARATUS

CROSS-REFERENCE TO RELATED
APPLICATION

This application is a continuation application of International Application PCT/JP2017/015925 filed on Apr. 20, 2017 and designated the U.S., the entire contents of which are incorporated herein by reference.

FIELD

The present invention relates to a non-transitory computer-readable storage medium storing a dangerous spot calculation program, a dangerous spot calculation method, and a dangerous spot calculation apparatus.

BACKGROUND

Conventionally, automatic identification system (AIS) data (data including a coordinate position, velocity, angle of a vessel, and the like) transmitted from an AIS mounted on the vessel is used to visualize a spot having a possible risk of vessel collision for vessel control work. For example, there is a method in which a sea area is divided into grids at constant intervals of latitude and longitude, and a grid having a large number of vessels or high average velocity calculated in each of the grids is determined as a dangerous spot.

As described above, while the dangerous spot having a large number of vessels or having high average velocity of vessel is referred to as a "hot spot" in some cases, the term "hot spot" generally refers to a local point where a certain index is high. For example, there is a technology in which a person's health is considered as a risk value, the risk values of an individual accumulated on a route used by the travel by the individual over a certain period of time are regarded as individual's risk in determining the individual risk, and the hourly risk is visualized to grasp the risk of the traveling individual.

Examples of the related art include Japanese Laid-open Patent Publication No. 2015-161987.

SUMMARY

According to an aspect of the embodiments, a method performed by a computer for a dangerous spot calculation includes: executing extraction processing that includes extracting Time to Closest Point of Approach included in a predetermined time from "risk value information" that stores a "Closest Point of Approach", the "Time to Closest Point of Approach" and a "risk value" in association with each other for "a first vessel and a second vessel"; the risk value being a value indicating a possibility of collision between the first vessel and the second vessel at the Closest Point of Approach and the Time to Closest Point of Approach; executing acquisition processing that includes acquiring the Closest Point of Approach and the risk value corresponding to the extracted. Time to Closest Point of Approach from the risk value information; executing determination processing that includes determining to which sea area the acquired Closest Point of Approach belongs to; and executing calculation processing that includes calculating a sum of risk values corresponding to the Closest Point of Approach for each of sea areas to which the determined Closest Point of Approach belongs.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view illustrating an exemplary data configuration of grid information according to an embodiment.

FIG. 4 is a diagram illustrating an exemplary data configuration of past track information according to an embodiment.

FIGS. 6A and 6B are diagrams illustrating an example of data indicating an exemplary data configuration of risk value calculation result information according to an embodiment.

FIG. 9 is a diagram illustrating an example of hot spot information according to an embodiment.

DESCRIPTION OF EMBODIMENTS

The above-described conventional technology, however, has a problem of difficulty in recognizing dangerous spots appropriately. For example, linking a risk to the current time and point would result in divergence from the future time and point of emergence of the risk, leading to difficulty in appropriate recognition of the occurrence time and point of the risk.

In one aspect, the present invention aims to provide a dangerous spot calculation program, a dangerous spot calculation method, and a dangerous spot calculation device capable of more appropriately recognizing a dangerous spot.

According to one embodiment of the present invention, it is possible to achieve an effect of recognizing dangerous spots more appropriately.

Hereinafter, an embodiment of a dangerous spot calculation program, a dangerous spot calculation method, and a dangerous spot calculation device according to the disclosed technology will be described in detail with reference to the drawings. Note that the present invention is not limited to the following embodiments. Each of the embodiments can be suitably combined within a range without causing contradiction between individual processing. In the following embodiments, the disclosed technology will be described in an exemplary case where the technology is applied to a support system for supporting navigation of a vessel. Note that in the following embodiments, each of "risk", "risk value", "collision risk", and "collision risk value" indicates the degree of possibility of collision in a predetermined time when vessels navigating in a target sea area of the navigation control continue taking a path and velocity at a certain time. In addition, a "hot spot" is a local sea area (for example, grid described below) that has a high index of possibility of collision of another vessel to a certain vessel after passage of a predetermined time (for example, after five minutes) from the current time. In addition, "time" includes date information and time information. Note that a region wider than a grid is referred to as an area.

Embodiments

Configuration of Support System

Figure 1:
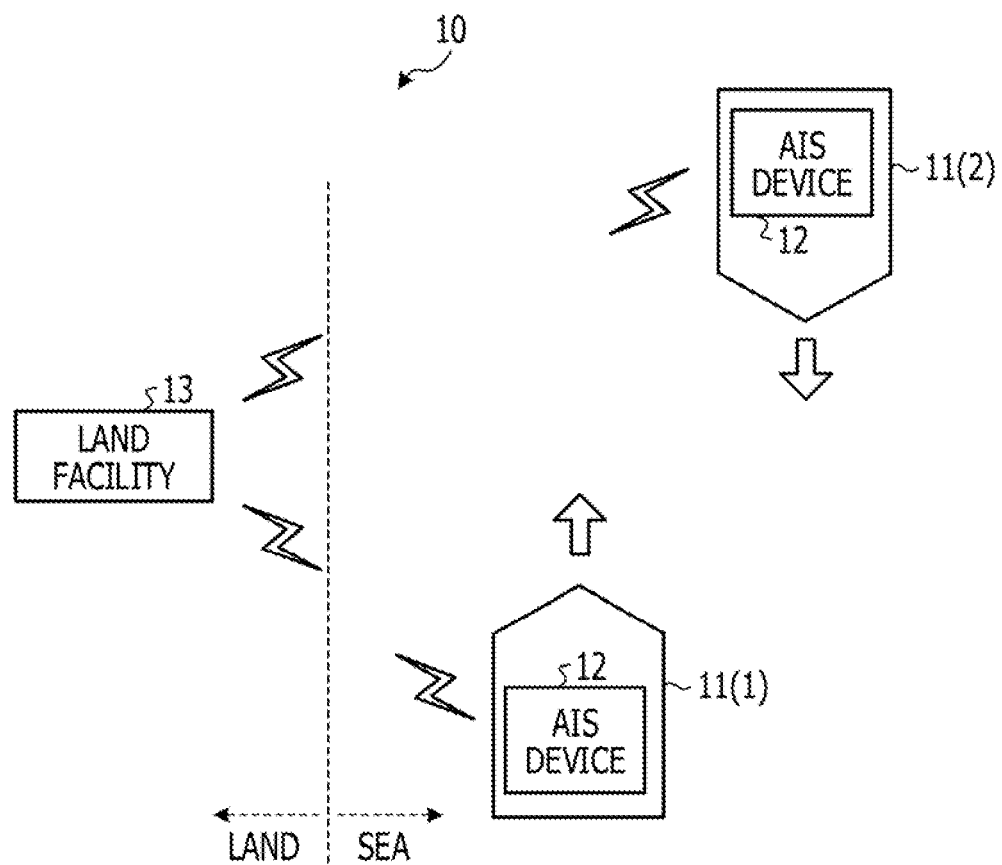
FIG. 1 is a diagram illustrating an example of a schematic configuration of a support system according to an embodiment.

First, an example of a support system 10 according to an embodiment will be described. FIG. 1 is a diagram illustrating an example of a schematic configuration of a support system according to an embodiment. The support system 10 is a marine traffic control system that supports navigation of a vessel.

FIG. 1 illustrates two vessels 11 (vessel 1 (own vessel) and vessel 2 (target vessel)), and a land facility 13. Note that the vessel 1 (own vessel) and the vessel 2 (target vessel) only represents a relative relationship. When viewing the vessel 1 (own vessel) from the vessel 2 (target vessel), the vessel 2 is the own vessel and the vessel 1 is the target vessel.

Each of the vessels 11 is equipped with an Automatic Identification System (AIS) device 12. For example, specific vessels are required to be equipped with the AIS device 12 by a law or the like. Specific vessels are all vessels with 300 gross tons or more engaged in international voyages, all passenger ships engaged in international voyages, and all vessels with 500 gross tons or more not engaged in international voyages. Note that vessels other than specific vessels may also be equipped with the AIS device 12.

The AIS device 12 periodically transmits, by wireless communication, AIS information including various types of information related to the vessel 11 equipped with the AIS device 12. Examples of the AIS information include information such as position in latitude and longitude, velocity, vessel name, time, bow direction, Maritime Mobile Service Identity (MMSI), vessel length, and vessel width. The AIS information is received by another vessel 11 or the land facility 13. The AIS information enables the other vessels 11 and the land facility 13 to grasp various types of information such as the position, velocity, vessel name, time, bow direction, MMSI, vessel length, vessel width related to the vessel 11 which is a transmitting source of the received AIS information.

The land facility 13 is a facility that performs navigation control of each of the vessels 11. Examples of this facility include a marine traffic center, a port traffic control room, or the like, in charge of monitoring and providing information regarding vessels on the sea. The land facility 13 grasps the position of each of the vessels 11 on the basis of the AIS information received from each of the vessels 11, information detected by radar, or the like, and provides each of the vessels 11 with various types of information related to marine traffic.

Configuration of Hot Spot Calculation Device

Figure 2:
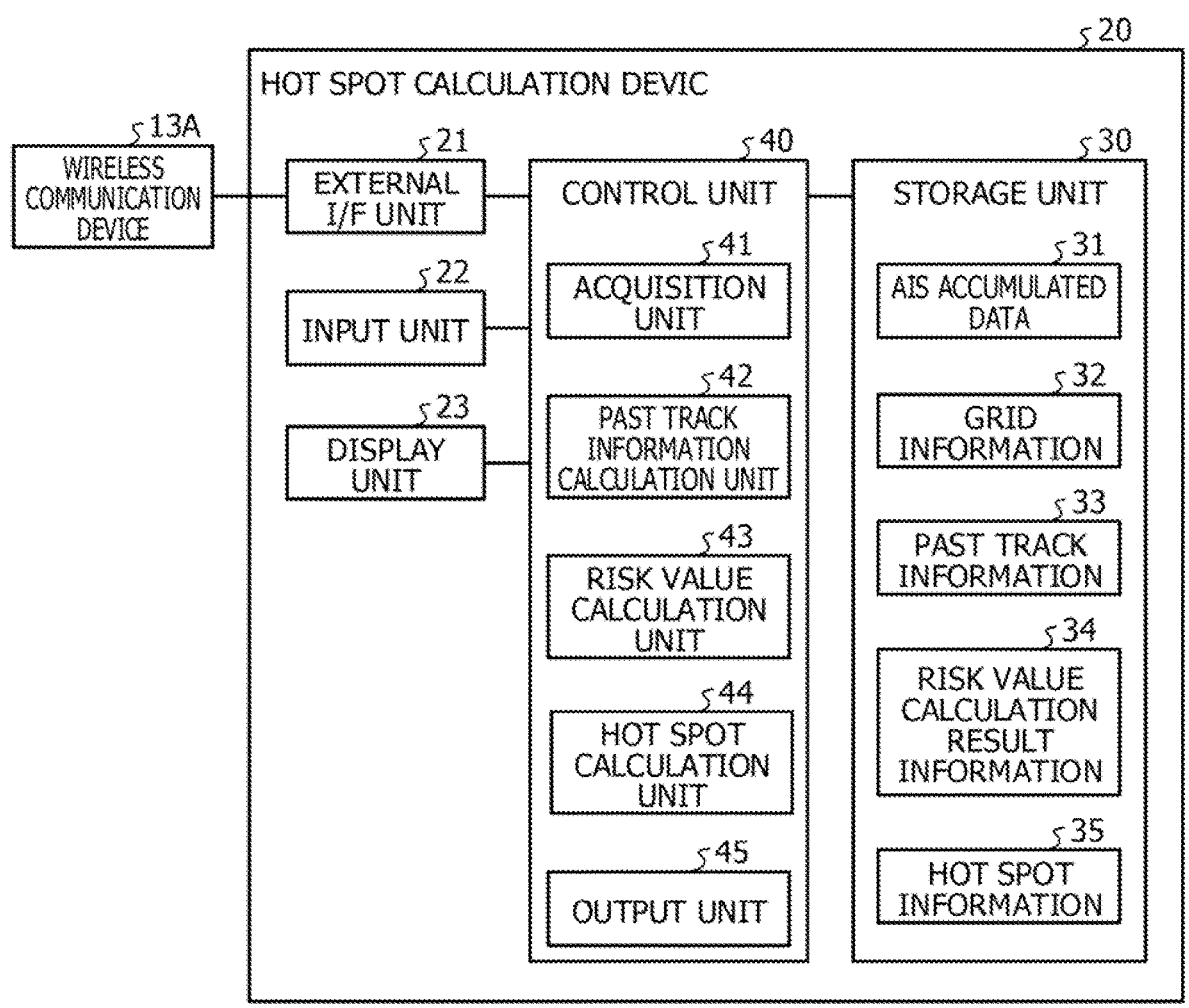
FIG. 2 is a diagram illustrating an example of a schematic configuration of a hot spot calculation device according to an embodiment.

Next, a configuration of a hot spot calculation device 20 according to an embodiment will be described. FIG. 2 is a diagram illustrating an example of a schematic configuration of a hot spot calculation device according to an embodiment. The hot spot calculation device 20 is a device provided at the land facility 13 and configured to support navigation of a vessel. For example, the hot spot calculation device 20 is mounted on a computer device such as a server disposed in the land facility 13.

The hot spot calculation device 20 includes an external I/F (interface) unit 21, an input unit 22, a display unit 23, a storage unit 30, and a control unit 40.

The external I/F unit 21 is an interface that transmits and receives various types of information to and from other devices, for example. The external I/F unit 21 can wirelessly communicate with each of the vessels 11 via a wireless communication device 13A such as an antenna provided in the land facility 13, and transmits and receives various types of information to and from each of the vessels 11. For example, the external I/F unit 21 receives AIS information from each of the vessels 11 via the wireless communication device 13A.

The input unit 22 is an input device for inputting various types of information. The input unit 22 includes an input device that receives an input of operation made by a mouse, a keyboard, or the like. The input unit 22 receives input of various types of information. For example, the input unit 22 receives an operation input instructing to start various types of processing. The input unit 22 inputs operation information representing received operation content to the control unit 40.

The display unit 23 is a display device that displays various types of information. Examples of the display unit 23 include display devices such as a liquid crystal display (LCD) and a cathode ray tube (CRT). The display unit 23 displays various types of information. For example, the display unit 23 displays various screens such as an operation screen.

The storage unit 30 is an external storage device such as a hard disk drive (HDD), a solid state drive (SSD), or an optical or magneto-optical disk. Note that the storage unit 30 may be a semiconductor memory capable of rewriting data such as a random access memory (RAM), a flash memory, and a non-volatile static random access memory (NVSRAM).

The storage unit 30 stores an operating system (OS) and various programs executed by the control unit 40. For example, the storage unit 30 stores a program for executing past track information tabulation processing and hot spot calculation processing described below. Furthermore, the storage unit 30 stores various data used in a program executed by the control unit 40. For example, the storage unit 30 stores AIS accumulated data 31, grid information 32, past track information 33, risk value calculation result information 34, and hot spot information 35. Each of the AIS accumulated data 31, the grid information 32, the past track information 33, the risk value calculation result information 34, and the hot spot information 35 has a data format as a table, as an example. The present invention, however, is not limited to this format, and each of the AIS accumulated data 31, the grid information 32, the past track information 33, the risk value calculation result information 34, and the hot spot information 35 may be in other data format such as the Comma Separated Values (CSV) format.

The AIS accumulated data 31 is data obtained by accumulating AIS information received from each of the vessels 11. The grid information 32 represents data storing various types of information related to a grid obtained by dividing a navigation control target sea area by the land facility 13 into grids of a predetermined size. For example, the grid information 32 stores identification information for identifying the grid, and grid region boundary position information.

FIG. 3 is a view illustrating an exemplary data configuration of grid information according to an embodiment. As illustrated in FIG. 3, the grid information 32 includes items such as "grid ID" and "grid range". Note that each of the items of the grid information 32 illustrated in FIG. 3 is an example, and other items may be included.

The "grid ID" is a region for storing identification information for identifying a grid. The grid identifier (ID) is assigned as identification information to each of the grids for identifying each of the grids. The "grid ID" stores the grid ID assigned to the grid. The "grid range" is a region for storing the latitude and longitude of the position of each of vertices of the region of the grid.

Here, the size of the grid will be described. In the case of vessels, avoidance behavior to avoid a collision may be manifested as turning for at least about 30 seconds or more. For example, the collision risk, which will be described below, is evaluated in 10 seconds, having a high possibility to be able to grasp the change in risk. Assuming that the general navigation velocity of the vessel is about 10 to 12 [kn (knot)], the navigation distance in 10 seconds would be about 50 to 60 [m]. In the present embodiment, in order to stably evaluate the collision risk, the size of the grid is determined so as to be able to avoid positioning the vessel in the non-adjacent grid when the position of the vessel is determined in a period of evaluating the collision risk. For example, the grid is a rectangular region with a side wide of 100 [m] at minimum. Note that the grid may have a side width of 100 to 200 [m]. Furthermore, the shape of the grid is not limited to a rectangle. For example, the shape may be a polygon such as a triangle or a hexagon. Moreover, the target range may be divided into grids by combining a plurality of polygons.

Past Track Information

FIG. 4 is a diagram illustrating an exemplary data configuration of past track information according to an embodiment. The past track information 33 represents data storing various types of information related to vessels that have passed through each of the grids. As illustrated in FIG. 4, the past track information 33 has items such as "grid ID", "approach angle", "exit angle", "velocity difference", and "vessel ID". Note that each of the items of the past track information 33 illustrated in FIG. 4 is an example, and other items may be included.

The "grid ID" is a region for storing a grid ID of a grid. The "approach angle" is a region for storing approach angles of vessels that have passed through a grid, to the grid. The "exit angle" is a region for storing the exit angle of vessels that have passed through a grid, from the grid. The "velocity difference" is a difference between the velocity of a vessel when the vessel approaches each of grids and the velocity of the vessel when the vessel exits the grid.

The "approach angle" and the "exit angle" are angles based on a predetermined direction (0 degree). For example, the "approach angle" and "exit angle" are angles defined clockwise with respect to the north direction. Note that the "exit angle" may be an angle at which the vessel has left the grid, or may use an angle difference of the angle at which the vessel has left the grid with respect to the "approach angle". The "vessel ID" is a region for storing identification information for identifying a vessel. The "vessel ID" stores the MMSI of the vessel that has passed through the grid at "approach angle", "exit angle", and "velocity difference".

Hot Spot Information

FIGS. 6A and 6B are diagrams illustrating an example of data indicating an exemplary data configuration of risk value calculation result information according to an embodiment. As illustrated in FIGS. 6A and 6B, the risk value calculation result information 34 includes items such as "time", "information regarding vessel 1", "information regarding vessel 2", "CPA", "TEPA", "risk value 1", "risk value 2" and "total risk value". Note that each of the items of the risk value calculation result information 34 illustrated in FIGS. 6A and 6B is an example, and other items may be included.

The "information regarding the vessel 1" and the "information regarding the vessel 2" are based on AIS information received from the vessel 1 and the vessel 2, respectively. For example, the "information regarding the vessel 1" includes information related to the vessel 1, such as "MMSI", "latitude", "longitude", "SOG", "COG", "vessel length", and "vessel width".

The "MMSI" related to the vessel 1 is the MMSI of the vessel 1 at "time" associated in the risk value calculation result information 34. "Latitude" and "longitude" related to the vessel 1 are latitude information and longitude information indicating the position of the vessel 1 at "time" associated in the risk value calculation result information 34, respectively. "SOG" related to the vessel 1 represents Speed Over Ground of the vessel 1 at "time" associated in the risk value calculation result information 34. "COG" related to the vessel 1 is Course Over Ground of the vessel 1 at "time" associated in the risk value calculation result information 34. The "vessel length" of the vessel 1 is the maximum length of the vessel 1. The "vessel width" of the vessel 1 is the maximum width of the vessel 1. In addition, in FIGS. 6A and 6B, "information regarding the vessel 2" is similar to "information regarding the vessel 1".

"CPA" in the risk value calculation result information 34 is an abbreviation of "Closest. Point of Approach", representing information indicating a sea area (for example, grid) where the vessel 2 (target vessel) approaches closest to the vessel 1 (own vessel). For example, the "CPA (Closest Point of Approach)" represents a sea area (grid) including a midpoint between the positions of the two vessels when the vessel 2 (target vessel) is at a Closest Point of Approach from the vessel 1 (own vessel). Moreover, "TCPA (Time to Closest Point of Approach)" in the risk value calculation result information 34 is an abbreviation of "Time to CPA", representing the time at which the vessel 1 (own vessel) and the vessel 2 (target vessel) reach the "CPA".

Figure 7:
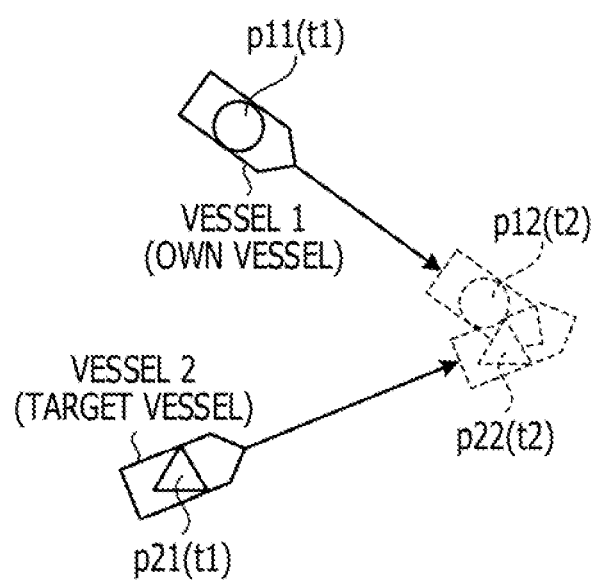
FIG. 7 is a view illustrating an example of time and sea area when two vessels are at closest points of approach in an embodiment.

FIG. 7 is a view illustrating an example of time and sea area when two vessels are at closest points of approach in an embodiment. In the example illustrated in FIG. 7, the vessel 1 (own vessel) existing in a sea area p11 at time t1 and the vessel 2 (own vessel) existing in a sea area p21 at time t1 travel to a sea area p12 and a sea area p22 respectively when the time shifts from t1 to t2, leading to occurrence of a collision or near miss. In the present embodiment, "TCPA" indicates the time having "risk value 1", "risk value 2", and "total risk value" at collision of the vessel 2 (own vessel) with the vessel 1 (own vessel), and the sea area in which the vessel 1 (own vessel) and the vessel 2 (target vessel) are located at the time is referred to as the "CPA". In addition, the present embodiment assumes that a collision risk exists in the "CPA" and the "TCPA" respectively representing the position and the time at which the vessel 1 (own vessel) and vessel 2 (target vessel) are in the closest points of approach.

"Risk value 1" and "risk value 2" in the risk value calculation result information 34 are risk values indicating the possibility of collision risk of the vessel 1 and the vessel 2. "Risk value 1" and "Risk value 2" are risk values calculated by different methods. Example of the risk value include Distance to Closest Point of Approach (DCPA), Time to Closest Point of Approach (TCPA), RiskLevel, and the like. Note that "risk value 1" or "risk value 2" may be a risk value obtained by converting the risk value as the collision risk value between the vessel 1 and the vessel 2 represented in a geometrical format, into a numerical expression. Examples of risk values represented in geometrical form include Obstacle Zone by Target (OZT), Collision Danger Line (CDL), and the like. Although FIGS. 6A and 6B exemplifies two types of risk values "risk value 1" and "risk value 2", one type or three or more types of risk values may be used.

Note that since each of "risk value 1" and "risk value 2" takes various possible value range, the possible value range (for example, lower limit value and upper limit value such as 0 or more and 1 or less) may preferably be defined by normalization beforehand. Furthermore, the "total risk value" in the risk value calculation result information 34 is a risk value obtained by weighting "risk value 1" and "risk value 2". For example, in FIGS. 6A and 6B, "CPA", "TCPA", "risk value 1", "risk value 2", "total risk value" corresponding to the line "time" "2013/1/10 2:40" in the first line are "c011", "tc012", "r011", "r012", and "R011", respectively.

Note that each of the following methods can be used for weighting at the time of calculating "risk value 1", "risk value 2", and "total risk value". The first method uses a simple average with uniform weights. The second method is ensemble learning that manually adds a weight to match a correct answer using a method such as multivariate analysis (such as multiple regression analysis) or machine learning when there is correct data of subjective risk values. The third method is an unsupervised machine learning method (such as clustering) when there is no correct data.

The control unit 40 is a device that controls the hot spot calculation device 20. Examples of the control unit 40 can be a processing device such as a central processing unit (CPU) or a micro processing unit (MPU), or can be an integrated circuit such as an application specific integrated circuit (ASIC) or a field programmable gate array (FPGA).

The control unit 40 includes an internal memory for storing a program and control data prescribing various processing procedures and executes various processing by using the stored program and data. Operation of various programs allows the control unit 40 to function as various processing units. For example, the control unit 40 includes an acquisition unit 41, a past track information calculation unit 42, a risk value calculation unit 43, a hot spot calculation unit 44, and an output unit 45.

The acquisition unit 41 acquires various types of information. For example, the acquisition unit 41 acquires travel information regarding the position and velocity of each of vessels (vessels 11). For example, the acquisition unit 41 acquires AIS information as travel information of each of vessels, from each of the vessels via the wireless communication device 13A. The acquisition unit 41 stores the acquired AIS information in the AIS accumulated data 31. In addition, the velocity of each of vessels may use the velocity stored in AIS information, and may be calculated from the positional change at each of times of each of vessels. The present embodiment describes a case where AIS information is received by the hot spot calculation device 20. Alternatively, the AIS information may be stored in an external storage device such as a storage device. In this case, the acquisition unit 41 acquires the AIS information of each of vessels from the external storage device.

Figure 5:
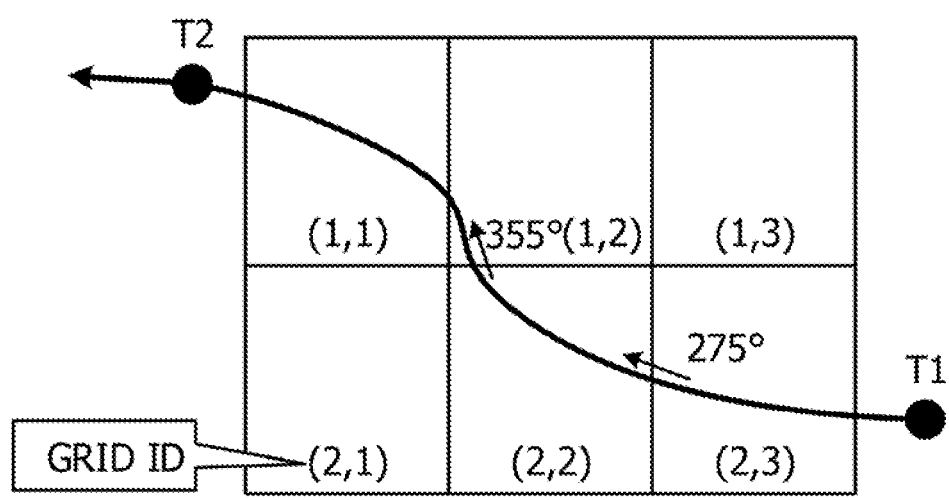
FIG. 5 is a view illustrating an example of an approach angle and an exit angle for each of grids according to an embodiment.

The past track information calculation unit 42 calculates, for each of grids, information indicating characteristics of the navigation of the vessel that has passed through the grid. For example, the past track information calculation unit 42 obtains, for each of grids, the traveling direction of each of the vessels that have passed through the grid, on the basis of the AIS accumulated data 31. FIG. 5 is a view illustrating an example of an approach angle and an exit angle for each of grids according to an embodiment. For example, the past track information calculation unit 42 refers to the AIS accumulated data 31 and obtains the position of each of vessels that have passed through the grid for each of grids at each of times when a vessel located in a sea area T1 moves to a sea area T2 as illustrated in FIG. 5, and then calculates an approach angle of each of the vessels to the grid as the traveling direction. In addition, the past track information calculation unit 42 refers to the AIS accumulated data 31 to determine, for each of grids, the velocity of each of the vessels that have passed through the grid. The velocity may be an average velocity at the time of passing through the grid or may be a velocity at the time of entering the grid.

Note that when the AIS information is transmitted from each of vessels in mutually different periods, the past track information calculation unit 42 may obtain the position and velocity of each of times by interpolation using the position and velocity of the AIS information for each of vessels. For example, the past track information calculation unit 42 calculates, for each of vessels, the position and the velocity of each of times complemented at one second intervals (or updated every one second). The past track information calculation unit 42 then stores the calculated position and velocity of each of vessels at each of times in association with ID (for example, MMSI or the like) of each of the vessels in the past track information 33 illustrated in FIG. 4.

The risk value calculation unit 43 acquires "information regarding the vessel 1" and "information regarding the vessel 2" from the AIS accumulated data 31. Subsequently, the risk value calculation unit 43 calculates "CPA", "TCPA", "risk value 1", and "risk value 2" from "information regarding the vessel 1" and "information regarding the vessel 2". The risk value calculation unit 43 then calculates the "total risk value" by weighting the "risk value 1" and the "risk value 2". The risk value calculation unit 43 stores the calculated "CPA", "TCPA", "risk value 1", "risk value 2", and "total risk value" in the risk value calculation result information 34.

Figure 8:
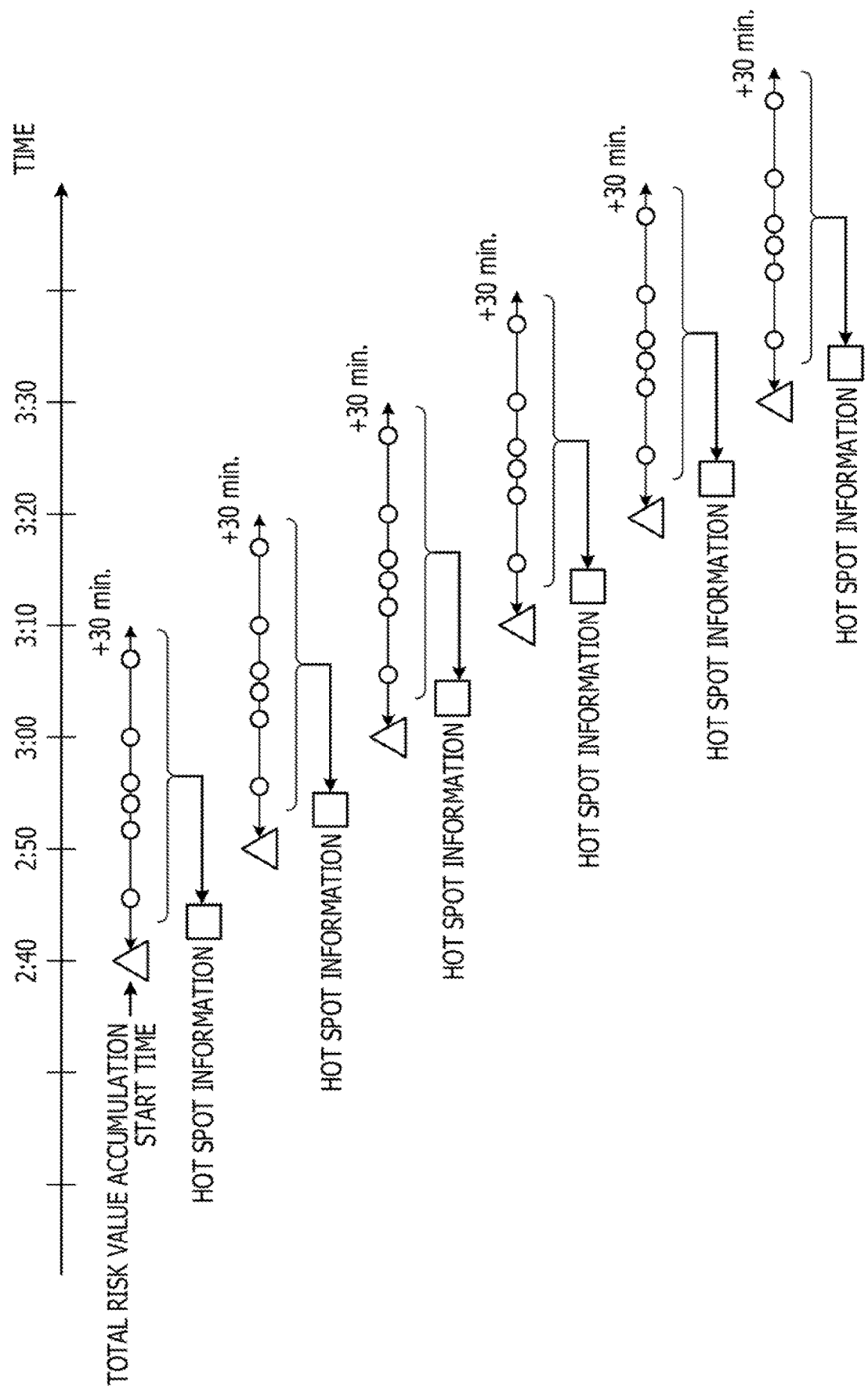
FIG. 8 is a diagram illustrating an example of a hot spot calculation method according to an embodiment.

The hot spot calculation unit 44 accumulates the "total risk values" (refer to FIG. 6B) for each of grids over a predetermined "optimal time span", and stores a "cumulative total risk value" accumulated for each of grids in the hot spot information 35. FIG. 8 is a diagram illustrating an example of a hot spot calculation method according to an embodiment.

As illustrated in FIG. 8, the hot spot calculation unit 44 sets the "optimal time span" to "30 minutes", for example, and extracts "TCPA" included within a range of "+30 minutes" from each "the accumulation start time of the total risk value", from the risk value calculation result information 34. Subsequently, the hot spot calculation unit 44 acquires the "CPA" and the "total risk value" corresponding to the extracted "TCPA" from the risk value calculation result information 34. The hot spot calculation unit 44 then determines to which grid the "CPA" acquired from the risk value calculation result information 34 belongs. Next, the hot spot calculation unit 44 integrates (sums up) the "total risk value" acquired from the risk value calculation result information 34 into the "cumulative total risk value" corresponding to the "grid ID" to which the "CPA" belongs in the hot spot information 35. Note that although the hot spot calculation unit 44 extracts and integrates the "total risk value", the present invention is not limited to this value, and the risk value to be extracted and integrated may be the "risk value 1" or the "risk value 2".

In the example illustrated in FIG. 8, the "total risk value" indicated by "o" included in the range of "+30 minutes" from "the accumulation start time of the total risk value" each indicated by "a" is integrated to calculate "hot spot information" for each of "accumulation start times of the total risk value" indicated by "□".

FIG. 9 is a diagram illustrating an example of hot spot information according to an embodiment. As illustrated in the hot spot information 35 of FIG. 9, the "hot spot information" for each of "accumulation start times of the total risk value" includes the "cumulative total risk value" integrated for each of "grid IDs". For example, in FIG. 9, the "cumulative total risk value" corresponding to the line of "grid ID" "1" in the first line is "R1". Note that the hot spot information 35 may be generated for each of "accumulation start times of the total risk value", or the "cumulative total risk value" may be updated for each of the "accumulation start times of the total risk value".

The output unit 45 outputs the risk of collision to the AIS device 12 and an external device of the vessel 11 having a high risk of collision. For example, the output unit 45 outputs three-stage hot spot warnings, for example, in accordance with the value of the "cumulative total risk value" for each of "grid IDs" calculated by the hot spot calculation unit 44, to each of grids on a chart of the display unit 23. For example, when the "cumulative total risk value" is less than a first threshold, the output unit 45 determines that risk of vessel collision is low and displays a plot of "green" points on the corresponding grid on the chart of the display unit 23. Moreover, for example, when the "cumulative total risk value" is the first threshold or more and less than a second threshold, the output unit 45 determines that the risk of a vessel collision is a little high and displays a plot of "yellow" points on the grid on the chart of the display unit 23. Moreover, for example, when the "cumulative total risk value" is the second threshold or more, the output unit 45 determines that the risk of a vessel collision is a high and display a plot of "red" points on the grid on the chart of the display unit 23. The output unit 45 outputs a warning of a hot spot as a visual heat map to each of grids on the chart of the display unit 23 in accordance with the value of the "cumulative total risk value", making it possible to intuitively detect the presence or absence of a hot spot and level of risk, and notify high risk of collision.

Past Track Information Tabulation Processing

Figure 10:
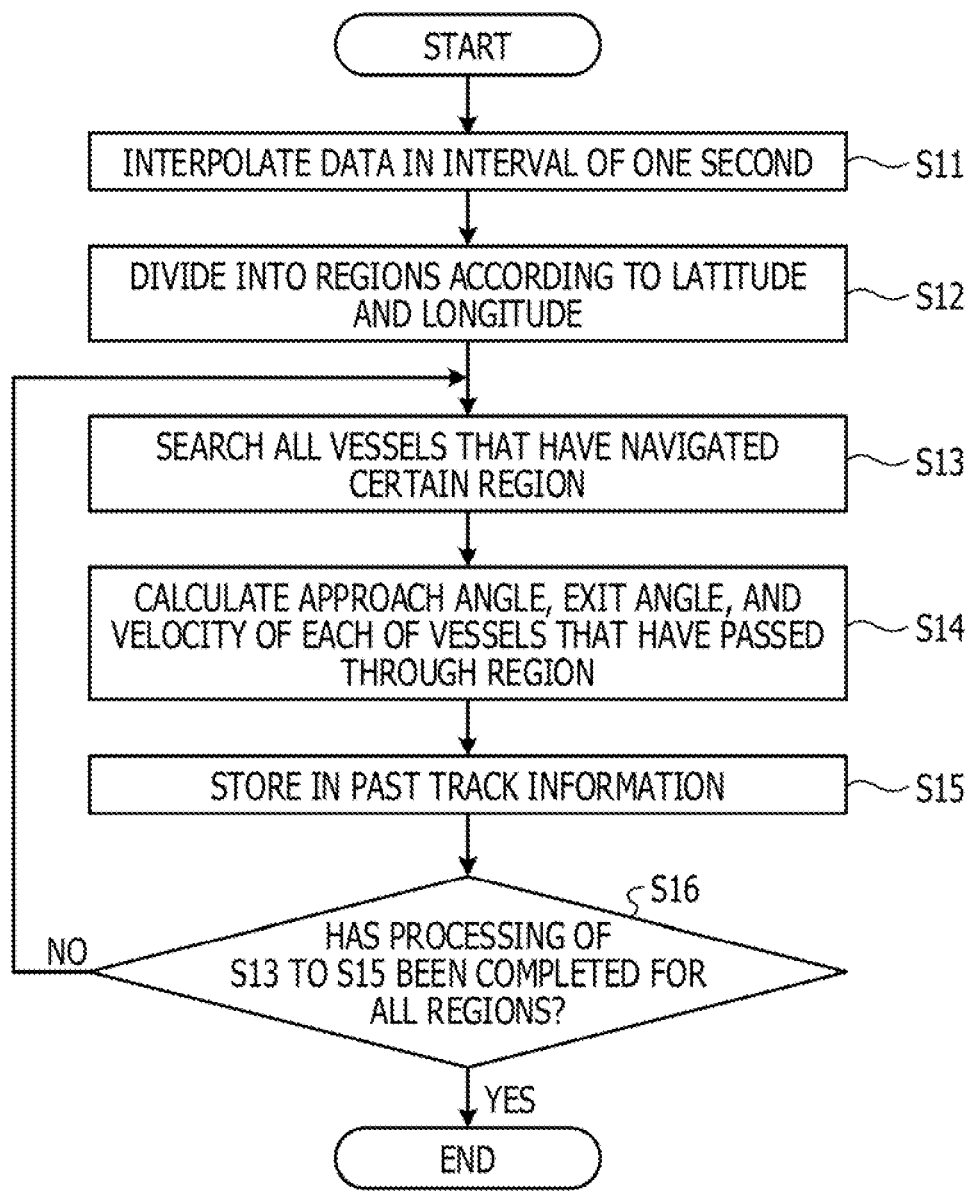
FIG. 10 is a flowchart illustrating an example of past track information tabulation processing according to an embodiment.

FIG. 10 is a flowchart of an example of past track information tabulation processing according to an embodiment. The past track information tabulation processing is executed at a predetermined timing, for example, a timing before collision risk calculation processing described below, or a timing at which predetermined operation instructing the start of the processing is received.

As illustrated in FIG. 10, the past track information calculation unit 42 calculates, in step S11, the position and velocity of each of times on the basis of the AIS accumulated data 31, every second by interpolation or the like for each of vessels. In step S12, the past track information calculation unit 42 divides the sea area targeted for navigation control of the land faculty 13 into regions (for example, grids) corresponding to the latitude and the longitude.

In step S13, the past track information calculation unit 42 searches all vessels that have navigated a certain region. In step S14, the past track information calculation unit 42 calculates the approach angle, exit angle, and the velocity of each of vessels that have passed through the region. In step S15, the past track information calculation unit 42 stores, in the past track information 33, the approach angle, exit angle, and the velocity of each of vessels for each of the regions. In step S16, the past track information calculation unit 42 determines whether or not the processing in step S13 to step S15 has been completed for all the regions. When the processing of step S13 to step S15 is completed for all the regions (step S16 Yes), the past track information calculation unit 42 finishes the past track information tabulation processing. In contrast, when the processing of step S13 to step S15 is not completed for all the regions (step S16 No), the past track information calculation unit 42 moves to the processing of step S13.

Risk Value Calculation Processing

Figure 11:
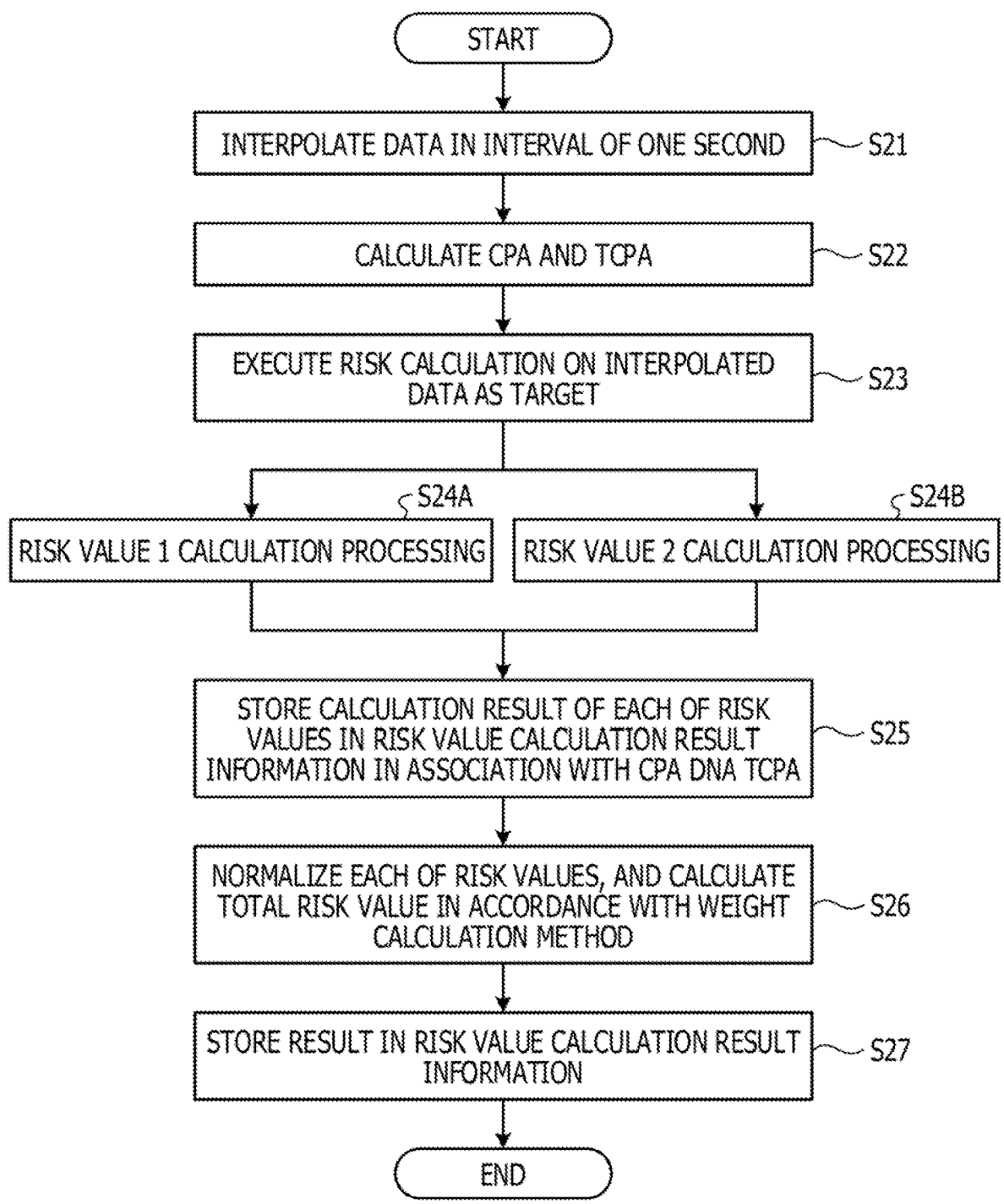
FIG. 11 is a flowchart illustrating an example of risk value calculation processing according to an embodiment.

FIG. 11 is a flowchart illustrating an example of the risk value calculation processing according to an embodiment. The risk calculation processing is executed at a predetermined timing, for example, in a predetermined period (for example, 10-second period) or a timing at which predetermined operation instructing the start of the processing is received.

As illustrated in FIG. 11, the risk value calculation unit 43 calculates, in step S21, the position and velocity of each of times on the basis of the AIS accumulated data 31, every second by interpolation or the like for each of vessels. In step S22, the risk calculation unit 43 calculates CPA and TCPA for each of combinations of vessels and for each of interpolation times (for example, one second).

In step S23, the risk value calculation unit 43 executes risk value calculation targeted for the data that has been complemented by the processing of step S21. Specifically, in step S24A following step S23, the risk value calculation unit 43 calls a risk value 1 calculation module for calculating a risk value 1 based on method 1, and executes risk value 1 calculation processing. Moreover, in step S24E following step S23, the risk value calculation unit 43 calls a risk value 2 calculation module for calculating a risk value 2 based on method 2, and executes risk value 2 calculation processing.

Note that for simplification of description, the flowchart of the risk value calculation processing illustrated in FIG. 11 includes only two steps of step S24A and step S24B as the calling steps of the risk value calculation module for calculating the risk value, being a case where two types of risk values are calculated. When a plurality of types of risk values are calculated, the risk value calculation module for each of the risk values is called in parallel and executed.

In step S24A, the risk value calculation unit 43 calls a risk value 1 calculation module for calculating the risk value 1 to be calculated as a subroutine and calculates the risk value 1 to be calculated. Meanwhile, in step S24B, the risk value calculation unit 43 calls a risk value 2 calculation module for calculating the risk value 2 to be calculated as a subroutine and calculates the risk value 2 to be calculated.

Note that in step S24A and step S24B, the risk value calculation unit 43 extracts the vessel 2 (target vessel) within a certain distance (for example, a grid in a predetermined level of proximity) with respect to the vessel 1 (own vessel) as illustrated in FIG. 1, for example. Moreover, the risk value calculation unit 43 may calculate an estimated future route of each of the extracted vessel 1 (own vessel) and vessel 2 (target vessel) by a prediction method based on the information accumulated in the past track information 33. For example, in execution of prediction of the course and velocity of a vessel, there would be a plurality of predicted future routes. In this case, for the possible courses of the vessel, the sum of courses and velocities obtained by weighting the courses and the velocities with the probability of occurrence of each may be defined as a predicted future route to be used by the vessel and may calculate the risk value 1 and the risk value 2 on the basis of the predicted future routes.

In step S25 following step S24A and step S24B, the risk value calculation unit 43 sets the risk value 1 calculation result obtained in step S24A as "risk value 1" and sets the risk value 2 calculation result obtained in step S24B as "risk value 2". Subsequently, the risk value calculation unit 43 stores the "risk value 1" and the "risk value 2" in the risk value calculation result information 34 in association with the CPA and TCPA corresponding to the "information regarding the vessel 1" and the "information regarding the vessel 2" respectively, which are the basis of the calculation.

In step S26, the risk value calculation unit 43 normalizes the "risk value 1" and the "risk value 2" stored in the risk value calculation result information 34 in step S25, and calculates the "total risk value" from the "risk value 1" and the "risk value 2" in accordance with the weight calculation method. For example, the risk value calculation unit 43 normalizes each of the "risk value 1" and the "risk value 2" so as to make them fall within a value range of 0 or more and 1 or less, and calculates the average of the "risk value 1" and the "risk value 2" as the "total risk value".

In step S27, the risk value calculation unit 43 stores the "total risk value" calculated in step S26 in the risk value calculation result information 34. After completion of step S27, the risk value calculation unit 43 finishes the risk value calculation processing.

Note that while the risk value calculation unit 43 calculates, in the risk value calculation processing described above, the "risk value 1" and the "risk value 2" using the predicted future routes calculated by weighting a plurality of predicted future routes with probability, the calculation processing is not limited to this. That is, the risk value calculation unit 43 may calculate the "risk value 1" and the "risk value 2" for each of the plurality of predicted future routes, weight each of the plurality of predicted future routes with each of probabilities to calculate the "risk value 1" and "risk value 2". This makes it possible to calculate risk values with higher flexibility.

Moreover, the risk value calculation unit 43 may calculate an estimated future route of each of the extracted vessel 1 (own vessel) and vessel 2 (target vessel) by a prediction method not based on the information accumulated in the past track information 33. In this case, it is possible to omit the past track information calculation unit 42 illustrated in FIG. 2, the past track information 33 illustrated in FIGS. 2 and 4, and the past track information tabulation processing illustrated in FIG. 10.

Hot Spot Calculation Processing

Figure 12:
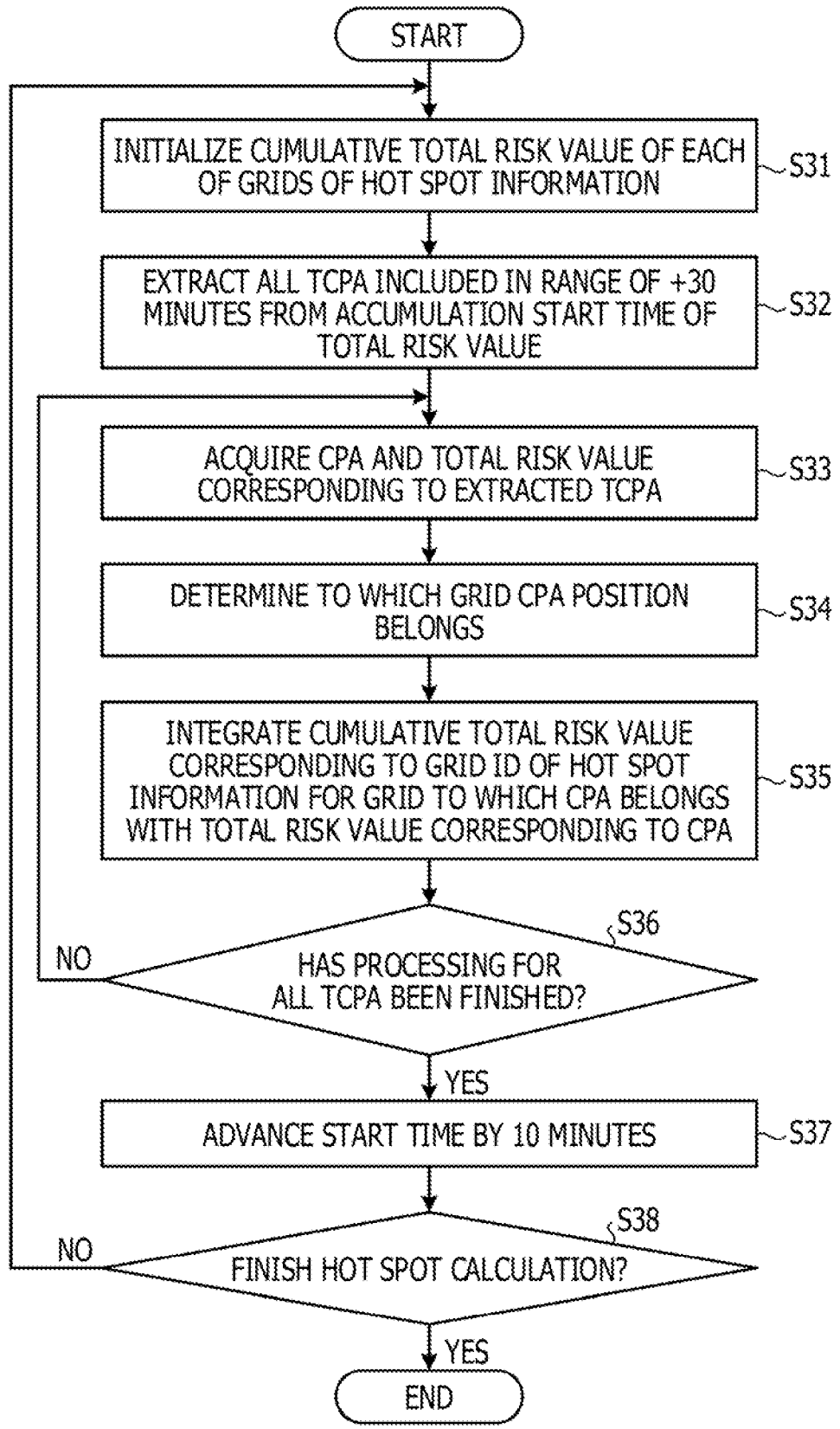
FIG. 12 is a flowchart illustrating an example of hot spot calculation processing according to an embodiment.

FIG. 12 is a flowchart illustrating an example of hot spot calculation processing according to an embodiment. The hot spot calculation processing is executed at a predetermined timing, for example, in a predetermined period (for example, period of risk calculation processing or more) or a timing at which predetermined operation instructing the start of the processing is received. FIG. 12 illustrates an example, for the available AIS accumulated data 31, in which the above-described "optimal time span" is set to a fixed value of "30 minutes" and the start time of "optimal time span" is advanced at predetermined intervals (for example 10 minutes) to calculate a hot spot. Note that the "optimal time span" may be variable as described below.

First, in step S31, the hot spot calculation unit 44 initializes the "cumulative total risk value" corresponding to all "grid IDs" in the hot spot information 35 (refer to FIG. 9) to zero. In step S32, the hot spot calculation unit 44 extracts all "TCPA" included in a range of "+30 minutes" from the "accumulation start time of the total risk value", from the hot spot information 35.

In step S33, the hot spot calculation unit 44 acquires "CPA" and "total risk value" corresponding to one "TCPA" extracted in step S32, from the hot spot information 35.

In step S34, the hot spot calculation unit 44 determines to which "grid" the "CPA" acquired in step S33 belongs. In step S35, the hot spot calculation unit 44 integrates the "cumulative total risk value" corresponding to the "grid ID" of the hot spot information 35 for the "grid" to which "CPA" is determined to belong in step S34, with the "total risk value" corresponding to the "CPA". In step S36, the hot spot calculation unit 44 determines whether or not the processing in steps S33 to S35 has been finished for all "TCPA" extracted in step S32. When the processing of step S33 to step S35 is finished for all "TCPA" extracted in step S32 (step S36 Yes), the hot spot calculation unit 44 moves to the processing of step S37. In contrast, when the processing of step S33 to step S35 is not finished for all "TCPA" extracted in step S32 (step S36 No), the hot spot calculation unit 44 moves to the processing of step S33. The hot spot calculation unit 44 that has returned the processing from step S36 to step S33 performs the processing of step S33 and subsequent processing for "TCPA" that has not been processed for the processes of step S33 to step S35.

In step S37, the hot spot calculation unit 44 advances the start time of the "optimal time span" by 10 minutes. By advancing the start time of the "optimal time span" by 10 minutes, the hot spot calculation unit 44 can calculate the hot spot information 35 having an update interval of 10 minutes.

In step S38, the hot spot calculation unit 44 determines whether to finish the hot spot calculation. In a case where the hot spot calculation is to be finished (step S38 Yes), the hot spot calculation unit 44 finishes the hot spot calculation processing. In contrast, in a case where the hot spot calculation is not to be finished (step S38 No), the hot spot calculation unit 44 moves to the processing of step S31.

Figure 13:
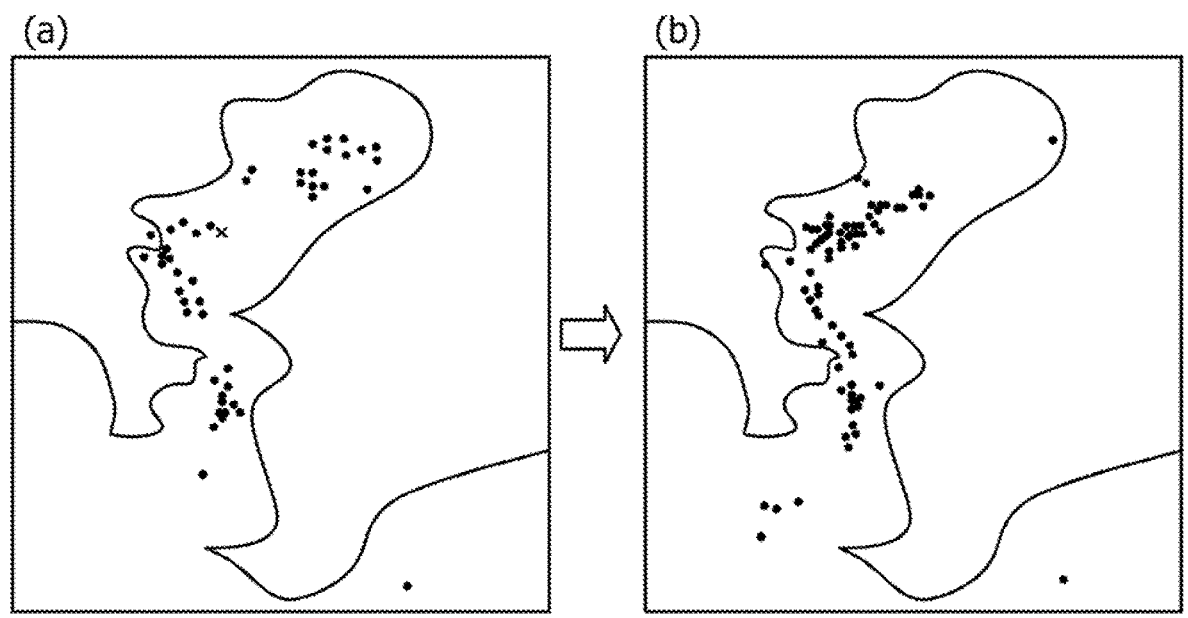
FIG. 13 is a view illustrating an example of comparison of modes of specifying dangerous spots between a conventional method and an embodiment.

FIG. 13 is a view illustrating an example of comparison of modes of specifying dangerous spots between a conventional method and an embodiment. According to the conventional method, a risk occurrence position and time are set to the current position and current time of the vessel 11, and thus, the positions of risks (distribution of points in the map of FIG. 13(a)) are dispersed. Therefore, effective hot spots would not emerge, making it difficult to specify dangerous spots (refer to FIG. 13(a)). According to the above-described embodiment, however, the risk occurrence position and occurrence time are set to CPA and TCPA. This leads to emergence of hot spots at the accident occurrence position before actual occurrence of vessel collisions (refer to the distribution of points in the map of FIG. 13(b)), making it easy to specify dangerous spots. That is, according to an embodiment, the time and area having prediction of high collision risk are specified and visualized, making it possible to provide the user with more useful information in terms of collision prevention.

Application Example 1 of Embodiment: Realtime Visualization of Hot Spots

As an application example of the above-described embodiment, sequentially updating hot spot calculation and visualizing the current hot spot in real time would make it possible to grasp dangerous regions at the current time point to be utilized as basic information for safe operation. In addition, the hot spot calculation device 20 disposed in the land facility 13 may distribute the hot spot information 35 in real time to the vessel 11 navigating the control target sea area. In this case, superimposing and displaying information such as the water channels, positions, velocities, directions, and the CPA of individual ships on the chart would make it possible to further enhance the convenience of the visualized hot spot information 35.

Application Example 2 of Embodiment: Visualization of Past Hot Spots

Figure 14:
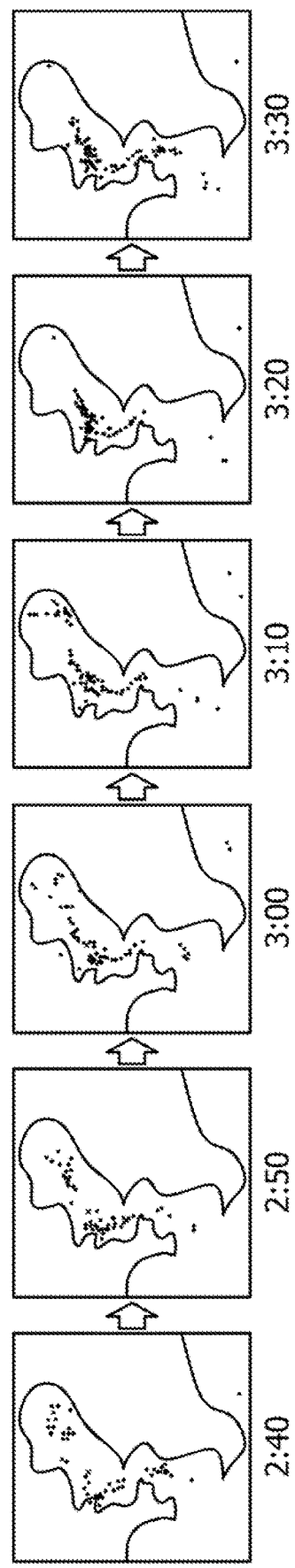
FIG. 14 is a diagram illustrating an example in which an embodiment is applied to visualization of past hot spots.

FIG. 14 is a diagram illustrating an example in which an embodiment is applied to visualization of past hot spots. As illustrated in FIG. 14, the hot spot information 35 indicated by the distribution of points in the map of FIG. 14 is visualized as a heat map on a chart. For example, heat maps changing at intervals of 10 minutes are displayed side by side or in animation. This makes it possible to achieve easy recognition and understanding of the process of occurrence and change of the regions having a high collision risk. In this manner, it is possible to utilize the technology for past accident analysis, or the like. In this case, superimposing and displaying information such as the water channels, positions, velocities, directions, and the CPA of individual ships on the chart would make it possible to further enhance the convenience of the visualized hot spot information 35.

Application Example 3 of Embodiment: Visualization of Future Hot Spots

Figure 15:
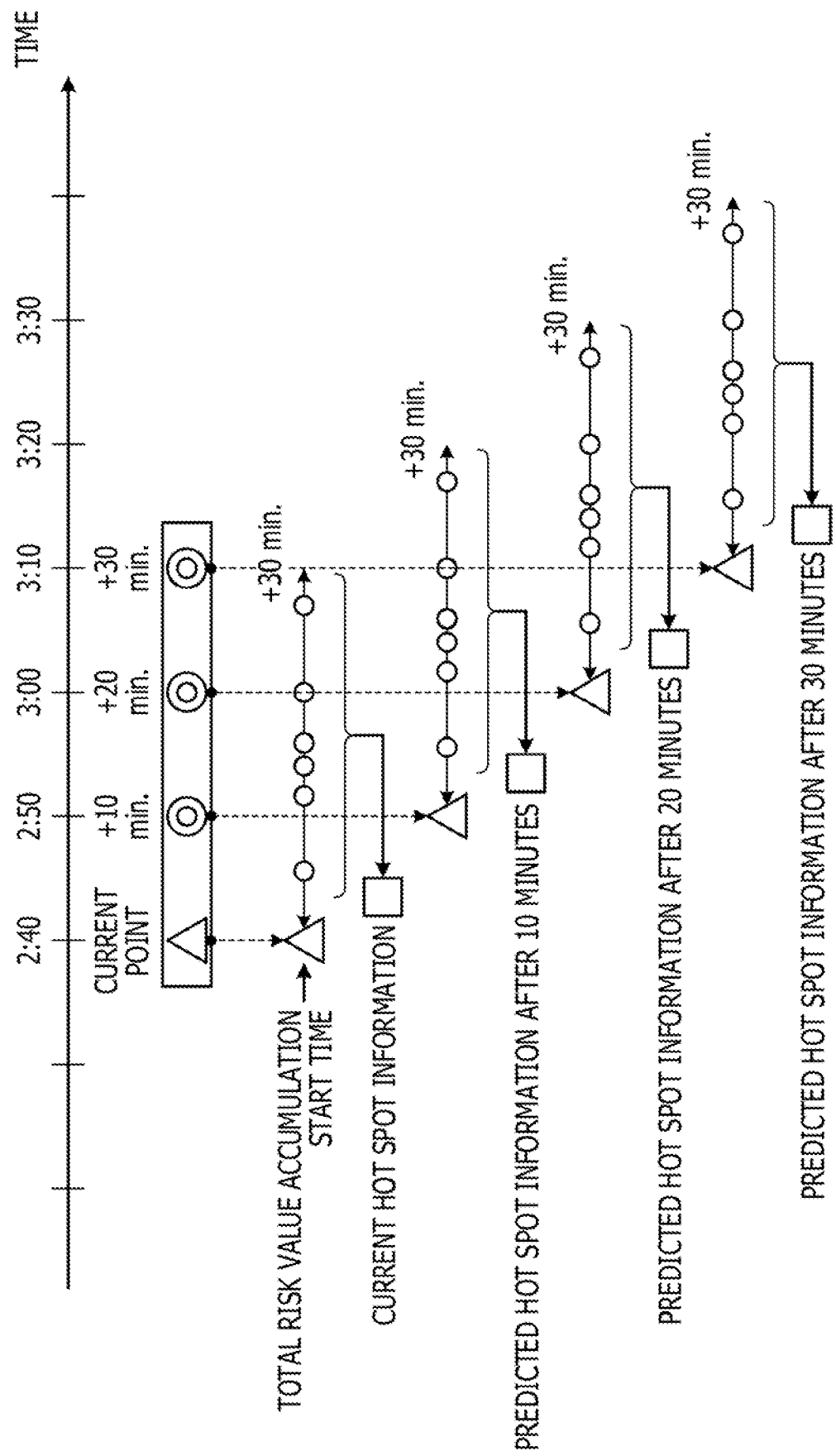
FIG. 15 is a diagram illustrating an example in which an embodiment is applied to visualization of future hot spots.

For example, assuming that the position, velocity, direction, or the like of each of vessels after passage of N (N=10, 20, 30, or longer term period) minutes are predicted, the "total risk value" and the hot spot information 35 are calculated on the basis of the predicted position, velocity, direction, or the like of each of the vessels. FIG. 15 is a diagram illustrating an example in which an embodiment is applied to visualization of future hot spots. For example, as illustrated in FIG. 15, the time 10 minutes after the current time is set as the "accumulation start time of the total risk value". Subsequently, "the total risk value" integrated on the basis of the position, velocity, direction, or the like of the vessel 11 predicted in 30 minutes from the "accumulation start time of the total risk value" after passage of 10 minutes is to be defined as "predicted hot spot information" after 10 minutes. Similarly, "predicted hot spot information" is calculated for the times after passage of 20 minutes or 30 minutes from the present. This makes it possible to visualize predicted future hot spots and grasp dangerous regions in advance.

Application Example 4 of Embodiment: Analysis of Trend Across Time Zones

Figure 16:
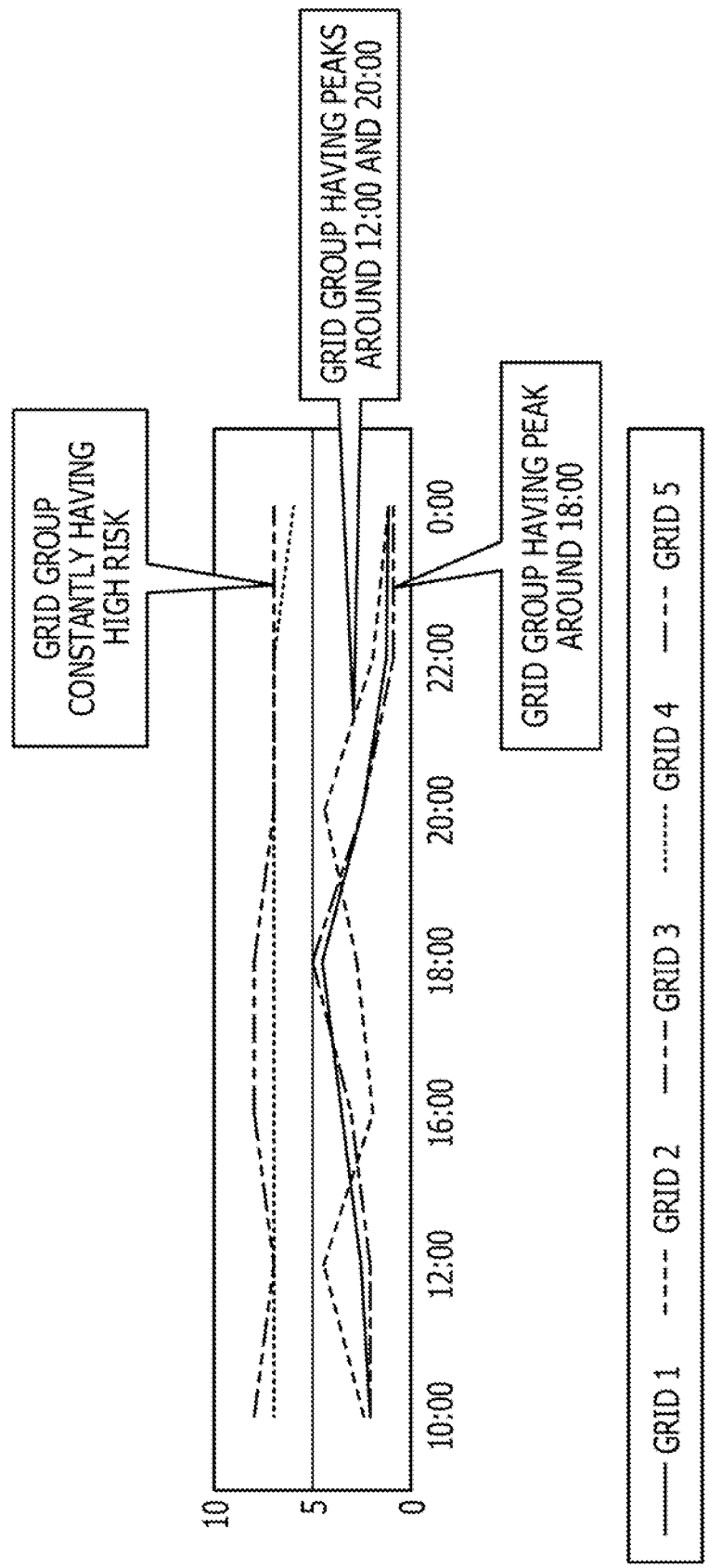
FIG. 16 is a diagram illustrating an example in which an embodiment is applied to time-series analysis of hot spots.

FIG. 16 is a diagram illustrating an example in which an embodiment is applied to time-series analysis of hot spots. For example, it is possible to analyze the time series trend of hot spots across time zones, using obtained hot spot data of a plurality of time points as an input. For example, after integrating heat map data for a plurality of time points, it is possible to use statistical analysis methods such as clustering (for example, Dynamic Time Warping (DTW)) targeted for time series change data of the "total risk value" of each of grids as a target so as to visualize the target data. This method enables discovery, across time zones, of a grid (or an area wider than a grid) constantly indicating high or low risk, and a grid having a common pattern such as having a higher risk during specific time zones (for example, in the morning and evening).

For example, it is observed from FIG. 16 that the time series change of the total risk value of 10:00 to 0:00 of each of a grid 1 illustrated in the solid line and a grid 3 illustrated in the one-dot chain line is a grid group having a high risk around 18:00. Moreover, it is observed that the time series change of the total risk value of 10:00 to 0:00 of a grid 2 illustrated in a broken line is a grid group having a high risk around 12:00 and 20:00. In addition, it is observed that the time series change of the total risk value of 10:00 to 0:00 of each of a grid 4 illustrated in the broken line and a grid 5 illustrated in the two-dot chain line is a grid group constantly having a high risk. In this manner, it is possible to provide a quantitative reference when grasping a typical pattern of risk increase and decrease between the same grid group or different grid groups or grasping a location needing caution for collision for each of time zones.

When the hot spot calculation device 20 in the above-described embodiment provides a visualization result of the collision risk of the vessel using a marine traffic control system or the like, hot spot calculation device 20 displays the realtime position of the vessel 11 on the map and displays predicted future routes to be used by each of the vessels and a graph of collision risk for each of vessels. Therefore, according to the above-described embodiment, it is possible to issue an alarm in the case of occurrence of a hot spot having a higher collision risk. Furthermore, according to the above-described embodiment, the vessel 11 located at the corresponding hot spot can be highlighted on a screen so as to be checked by the operator on the display unit 23 or the like, making it possible to implement communication with the collision risk to the vessel 11 as necessary.

Other Embodiments

Although embodiments of the disclosed technology have been described above, the disclosed technology may be implemented in various forms in addition to the above embodiments. Thus, hereinafter, other embodiments included in the disclosed technology will be described.

1: Optimal Time Span

In the above-described embodiment, the hot spot calculation unit 44 uses the "optimal time span" with a fixed width of "+30 minutes". When the "optimal time span" is too narrow, however, processing would target cases involving collisions or near misses in the very near future. This would result in less cases where TCPA falls within the range of the "optimal time span" in the grid, leading to a situation where the sum of "total risk value" might be zero in some cases. This would result in sparse distribution of high risk grids. Accordingly, this makes it difficult to calculate effective hot spots.

On the other hand, when the "optimal time span" is too wide, cases involving collisions or near misses in the distant future would also be included, and there would be many cases where TCPA falls within the "optimal time span" range in the grid. In this case, although continuous hot spots can be obtained, characteristics of the hot spot at each of times might be weakened, which makes it difficult to capture the hot spot as a dynamically changing risk.

To overcome this, the AIS accumulated data 31 in the past is to be used to specify a plurality of positions and times of occurrence of collisions and near misses. Moreover, it is allowable to determine the "optimal time span" so as to maximize a spatial correlation coefficient between the sum of the "total risk values" and the presence or absence of collision and near miss (or the degree of near miss calculated by the distance between vessels) in all collision and near miss cases.

Figure 17:
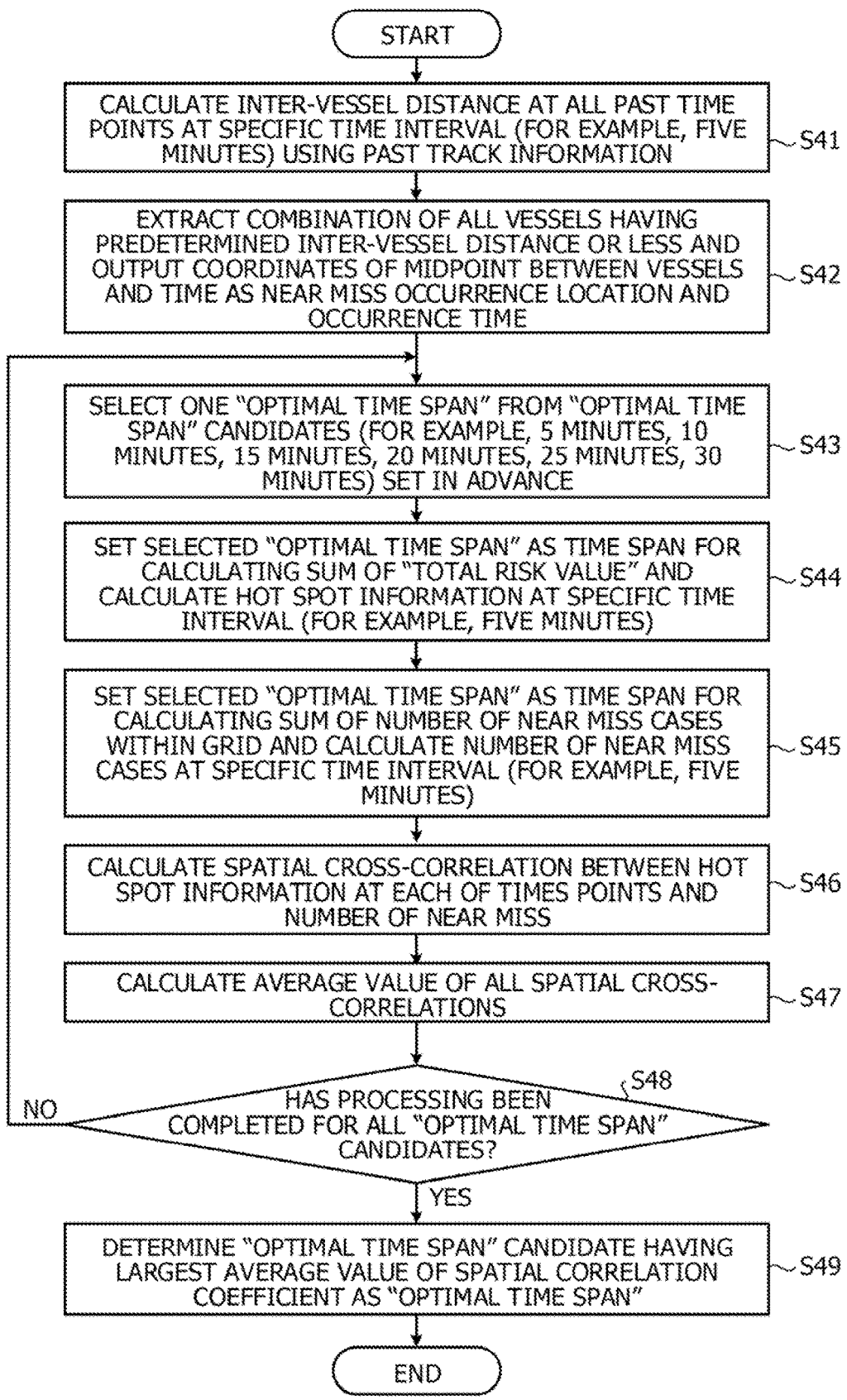
FIG. 17 is a flowchart illustrating an example of optimal time span determination processing according to another embodiment.

FIG. 17 is a flowchart illustrating an example of an optimal time span determination processing according to another embodiment. The hot spot calculation unit 44 executes the optimal time span determination processing illustrated in FIG. 17 before executing the hot spot calculation processing according to the embodiment illustrated in FIG. 12. The hot spot calculation unit 44 may execute the optimal time span determination processing at a predetermined timing, or may execute the optimal time span determination processing prior to the hot spot calculation processing every time the hot spot calculation processing is executed. First, in step S41, the hot spot calculation unit 44 calculates an inter-vessel distance at all past time points at a specific time interval (for example, five minutes) using the past track information 33.

In step S42, the hot spot calculation unit 44 extracts a combination of all vessels having a predetermined inter-vessel distance or less and outputs coordinates of the midpoint between the vessels and the time as a near miss occurrence location and occurrence time. The hot spot calculation unit 44 stores the near miss occurrence location and occurrence time, which are output in step S42, in a near miss table (not illustrated).

In step S43, the hot spot calculation unit 44 selects one "optimal time span" from among a plurality of "optimal time span" candidates (for example, 5 minutes, 10 minutes, 15 minutes, 20 minutes, 25 minutes, 30 minutes, or the like) set in advance. In step S44, the hot spot calculation unit 44 sets the "optimal time span" selected in step S43 as a time span for calculating the sum of the "total risk value", and calculates the hot spot information at a specific time interval (for example, five minutes) with reference to the risk value calculation result information 34. The hot spot calculation unit 44 outputs the hot spot information calculated in step S44 to the hot spot information 35.

In step S45, the hot spot calculation unit 44 sets the "optimal time span" selected in step S43 as the time span for calculating the sum of the number of near miss cases within a grid, and calculates the number of near miss cases at a specific time interval (for example, five minutes) with reference to a near miss table (not illustrated). The hot spot calculation unit 44 outputs the calculated number of near miss cases to a near miss case number table (not illustrated).

In step S46, the hot spot calculation unit 44 calculates the spatial cross-correlation between the hot spot information at each of time points calculated at a specific time interval in step S43 and step S44 and the number of near miss cases. In step S47, the hot spot calculation unit 44 calculates an average value of all the spatial cross-correlations calculated in step S46, and stores the calculated average value in a spatial cross correlation table (not illustrated).

In step S48, the hot spot calculation unit 44 determines whether or not the processes in steps S43 to S47 have been completed for all "optimal time span" candidates. When the processing of step S43 to step S47 on all the "optimal time span" candidates is completed (step S48 Yes), the hot spot calculation unit 44 moves to the processing of step S49. In contrast, when the processing of step S43 to step S47 on all the "optimal time span" candidates is not completed (step S48 No), the hot spot calculation unit 44 moves to the processing of step S43. After moving the processing from step S48 to step S43, the hot spot calculation unit 44 selects an unselected candidate among a plurality of "optimal time span" candidates set in advance.

In step S49, the hot spot calculation unit 44 determines the "optimal time span" candidate having the largest average value of the spatial correlation coefficient calculated in step S36 stored in the spatial cross-correlation table (not illustrated), as the "optimal time span". After completion of step S49, the hot spot calculation unit 44 finishes the optimal time span determination processing.

Note that the hot spot calculation unit 44 may also calculate the "optimal time span" for each of areas and/or for each of grids and/or for each of time zones (for example, daytime time zone, nighttime time zone, or the like).

As a result of calculation of hot spots in the optimal time span by the above-described optimal time span determination processing, it is possible to obtain dynamic and useful hot spots that include dangerous regions having occurrence of collision and the near miss and that do not include safe regions in which there is no occurrence of collision or near miss.

2: Arrangement of Hot Spot Calculation Device 20

In the embodiment described above, the hot spot calculation device 20 is mounted in a computer device such as a server disposed in the land facility 13. However, the disclosed technology is not limited to this, and the hot spot calculation device 20 may be directly mounted on the vessel 11 for the purpose of preventing the collision of the vessel 11.

In addition, each component of each device illustrated in the drawings is functionally conceptual, and thus the devices do not have to be physically configured as illustrated in the drawings. That is, the specific states of separation and integration of each of the apparatus and devices are not limited to the illustrated aspects, and all or part of the apparatus or devices can be functionally or physically separated and integrated in any unit, in accordance with various loads, use status, and the like. For example, the risk value calculation unit 43 and the hot spot calculation unit 44 may be integrated to each other. Alternatively, for example, the risk value calculation unit 43 may be dispersed into an estimated future path calculation unit that calculates an estimated future path of the vessel 1 (own vessel) and the vessel 2 (target vessel), and a risk calculation unit. Alternatively, the hot spot calculation unit 44 may be dispersed into an extraction unit, an acquisition unit, a determination unit, and a total risk value calculation unit. Here, the extraction unit extracts the Time to CPA included in the predetermined time from the risk value calculation result information 34. The acquisition unit acquires, from the risk value calculation result information 34, the Closest Point of Approach and the risk value corresponding to the extracted Time to CPA. The determination unit determines to which sea area the acquired Closest Point of Approach belongs. The total risk value calculation unit totals the risk values corresponding to the Closest Point of Approach for each of sea areas to which the determined Closest Point of Approach belongs.

All or any part of each processing function performed by each device may be realized by a CPU and a program analyzed and executed by the CPU, or may be realized as hardware using wired logic.

Hot Spot Calculation Program

Figure 18:
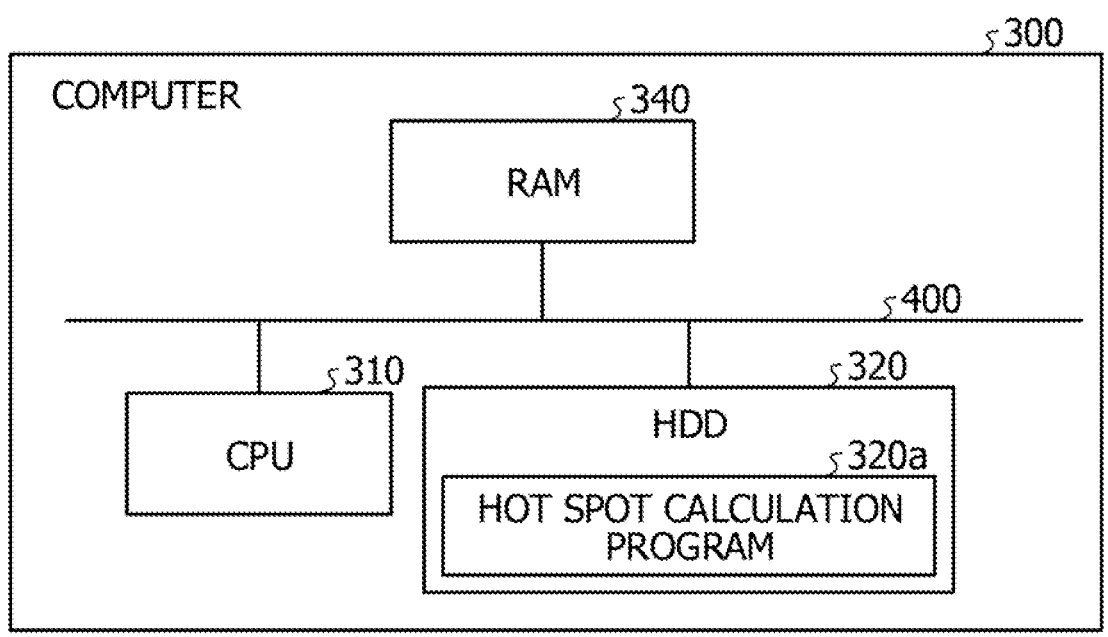
FIG. 18 is a diagram illustrating an example of a computer that executes a hot spot calculation program according to an embodiment.

Various types of processes described in the above embodiments can also be implemented by executing a program prepared in advance on a computer system such as a personal computer or a work station. Accordingly, the following will describe an example of the computer system that executes a program having functions similar to the above embodiments. FIG. 18 is a diagram illustrating an example of a computer that executes a hot spot calculation program.

As illustrated in FIG. 18, a computer 300 includes a CPU 310, a hard disk drive (HDD) 320, and a random access memory (RAM) 340. The components 310 to 340 are each connected via a bus 400.

The HDD 320 preliminarily stores a hot spot calculation program 320a having the function similar to each of processing units of the above-described embodiments. For example, the HDD 320 stores the hot spot calculation program 320a having function similar to the acquisition unit 41, the past track information calculation unit 42, the risk value calculation unit 43, the hot spot calculation unit 44, and the output unit 45 of the above embodiments, Note that each of the functions of the hot spot calculation program 320a may be divided into modules as appropriate.

The HDD 320 also stores various data. For example, the HDD 320 stores the OS and various data.

The CPU 310 reads the hot spot calculation program 320a from the HDD 320 and executes the program to execute operation similar to operation of each of the processing units of the embodiment. That is, the hot spot calculation program 320a is provided to execute operation similar to operation performed by the acquisition unit 41, the past track information calculation unit 42, the risk value calculation unit 43, the hot spot calculation unit 44, and the output unit 45 in the embodiments.

Note that the hot spot calculation program 320a described above does not necessarily have to be stored in the HDD 320 from the beginning. For example, the program may be preliminarily stored in a "portable physical medium" such as a flexible disk (FD), a compact disk read only memory (CD-ROM), a digital versatile disk (DVD), a magneto-optical disk, or an IC card to be inserted into the computer 300. The computer 300 may be configured to read the program from these media and execute the program.

Alternatively, the program may be stored in "another computer (or a server)" or the like connected to the computer 300 via a public line, the Internet, a local area network (LAN), a wide area network (WAN), or the like. The computer 300 may be configured to read the program from these media and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium for storing a dangerous spot calculation program which causes a processor to perform processing, the processing comprising:

executing extraction processing that includes extracting Time to Closest Point of Approach (TCPA) from risk value information stored in a memory, the risk value information having an information structure including a plurality of data sets, each of the plurality of data sets including, for at least any two vessels from among a plurality of vessels, a "Closest Point of Approach" (CPA), the TCPA, and a "risk value", the extracted TCPA indicating a time length equal to or less than a given threshold, the risk value of each data set being a value determined based in part on the corresponding CPA and the corresponding TCPA as indicating a possibility of collision between vessels at a geographical point indicated by the corresponding CPA at a time point indicated by the corresponding TCPA;

executing acquisition processing that includes acquiring, for each extracted TCPA, the CPA and the risk value corresponding to the extracted TCPA from the risk value information;

executing, for each acquired CPA, determination processing that includes determining, from among a plurality of sea areas, a sea area to which the acquired CPA belongs, by using grid information representing data related to a grid obtained by dividing a control target sea area into grids of a predetermined size; and executing calculation processing that includes calculating, for each of determined sea areas, a sum of risk values corresponding to the acquired CPA.

2. The non-transitory computer-readable storage medium according to claim 1, wherein the processing further comprises:

specifying, in the risk value information, the CPA where a distance between the first vessel and the second vessel is a predetermined distance or less and specifying the TCPA and the risk value corresponding to the CPA;

calculating a correlation value between a "first sum" and a "second sum", the first sum being a sum of risk values corresponding to the TCPA included in a candidate time among the specified TCPA for each of the sea areas and time zones to which the CPA corresponding to the risk value belongs, the TCPA included in the candidate time being the TCPA indicating a time length equal to or less than the candidate time, the second sum being a sum of the number of the CPA corresponding to the TCPA included in the candidate time for each of the sea areas and time zones to which the CPA belongs;

averaging the calculated correlation values; and determining the candidate time that maximizes the averaged correlation value, as the predetermined time.

3. The non-transitory computer-readable storage medium according to claim 1, wherein the risk value information stores the CPA, the TCPA, and the "risk value" in association with each other for "the first vessel and the second vessel" in the past that is before a current point.

4. The non-transitory computer-readable storage medium according to claim 1, wherein the risk value information stores the CPA, the TCPA, and the "risk value" in association with each other for "the first vessel and the second vessel" at a current point.

5. The non-transitory computer-readable storage medium according to claim 1, wherein the processing further comprises:

predicting the CPA, the TCPA, and "the risk value" for the "first vessel and the second vessel" in the future that is after a current point; and storing the CPA, the TCPA, and "the risk value" which are predicted in association with each other for "the first vessel and the second vessel" in the risk value information.

6. The non-transitory computer-readable storage medium according to claim 1, wherein the processing further comprises:

performing statistical analysis on time series transition of the sum of the risk values calculated by the calculation processing for each of sea areas to which the determined CPA belongs.

7. A method performed by a computer for a dangerous spot calculation, the method comprising:

executing extraction processing that includes extracting Time to Closest Point of Approach (TCPA) from risk value information stored in a memory, the risk value information having an information structure including a plurality of data sets, each of the plurality of data sets including, for at least any two vessels from among a plurality of vessels, a "Closest Point of Approach" (CPA), the TCPA, and a "risk value", the extracted TCPA indicating a time length equal to or less than a given threshold, the risk value of each data set being a value determined based in part on the corresponding CPA and the corresponding TCPA as indicating a possibility of collision between vessels at a geographical point indicated by the corresponding CPA at a time point indicated by the corresponding TCPA;

executing acquisition processing that includes acquiring, for each extracted TCPA, the CPA and the risk value corresponding to the extracted TCPA from the risk value information;

executing, for each acquired CPA, determination processing that includes determining, from among a plurality of sea areas, a sea area to which the acquired CPA belongs, by using grid information representing data related to a grid obtained by dividing a control target sea area into grids of a predetermined size; and executing calculation processing that includes calculating, for each of determined sea areas, a sum of risk values corresponding to acquired CPA.

8. The method according to claim 7, further comprising:

specifying, in the risk value information, the CPA where a distance between the first vessel and the second vessel is a predetermined distance or less and specifying the TCPA and the risk value corresponding to the CPA;

calculating a correlation value between a "first sum" and a "second sum", the first sum being a sum of risk values corresponding to the TCPA included in a candidate time among the specified TCPA for each of the sea areas and time zones to which the CPA corresponding to the risk value belongs, the TCPA included in the candidate time being the TCPA indicating a time length equal to or less than the candidate time, the second sum being a sum of the number of the CPA corresponding to the TCPA included in the candidate time for each of the sea areas and time zones to which the CPA belongs;

averaging the calculated correlation values; and determining the candidate time that maximizes the averaged correlation value, as the predetermined time.

9. The method according to claim 7, wherein the risk value information stores the CPA the TCPA, and the "risk value" in association with each other for "the first vessel and the second vessel" in the past that is before a current point.

10. The method according to claim 7, wherein the risk value information stores the CPA, the TCPA, and the "risk value" in association with each other for "the first vessel and the second vessel" at a current point.

11. The method according to claim 7, further comprising:

predicting the CPA, the TCPA, and "the risk value" for the "first vessel and the second vessel" in the future that is after a current point; and storing the CPA, the TCPA, and "the risk value" which are predicted in association with each other for "the first vessel and the second vessel" in the risk value information.

12. The method according to claim 7, further comprising:

performing statistical analysis on time series transition of the sum of the risk values calculated by the calculation processing for each of sea areas to which the determined CPA belongs.

13. An apparatus for a dangerous spot calculation, the apparatus comprising:

a memory; and a processor coupled to the memory, the processor being configured to execute extraction processing that includes extracting Time to Closest Point of Approach (TCPA) from risk value information stored in a memory, the risk value information having an information structure including a plurality of data sets, each of the plurality of data sets including, for at least any two vessels from among a plurality of vessels, a "Closest Point of Approach"

(CPA), the TCPA, and a "risk value", the extracted TCPA indicating a time length equal to or less than a given threshold, the risk value of each data set being a value determined based in part on the corresponding CPA and the corresponding TCPA as indicating a possibility of collision between vessels at a geographical point indicated by the corresponding CPA at a time point indicated by the corresponding TCPA, execute acquisition processing that includes acquiring, for each extracted TCPA, the CPA and the risk value corresponding to the extracted TCPA from the risk value information, execute, for each acquired CPA, determination processing that includes determining, from among a plurality of sea areas, a sea area to which the acquired CPA belongs, by using grid information representing data related to a grid obtained by dividing a control target sea area into grids of a predetermined size, and execute calculation processing that includes calculating, for each of determined sea areas, a sum of risk values corresponding to acquired CPA.

14. The apparatus according to claim 13, wherein the processor is further configured to specify, in the risk value information, the CPA where a distance between the first vessel and the second vessel is a predetermined distance or less and specifying the TCPA and the risk value corresponding to the CPA;

calculate a correlation value between a "first sum" and a "second sum", the first sum being a sum of risk values corresponding to the TCPA included in a candidate time among the specified TCPA for each of the sea areas and time zones to which the CPA corresponding to the risk value belongs, the TCPA included in the candidate time being the TCPA indicating a time length equal to or less than the candidate time, the second sum being a sum of the number of the CPA corresponding to the TCPA included in the candidate time for each of the sea areas and time zones to which the CPA belongs;

average the calculated correlation values; and determine the candidate time that maximizes the averaged correlation value, as the predetermined time.

15. The apparatus according to claim 13, wherein the risk value information stores the CPA, the TCPA, and the "risk value" in association with each other for "the first vessel and the second vessel" in the past that is before a current point.

16. The apparatus according to claim 13, wherein the risk value information stores the CPA, the TCPA, and the "risk value" in association with each other for "the first vessel and the second vessel" at a current point.

17. The apparatus according to claim 13, wherein the processor is configured to predict the CPA, the TCPA, and "the risk value" for the "first vessel and the second vessel" in the future that is after a current point; and store the CPA, the TCPA, and "the risk value" which are predicted in association with each other for "the first vessel and the second vessel" in the risk value information.

18. The apparatus according to claim 13, wherein the processor is configured to perform statistical analysis on time series transition of the sum of the risk values calculated by the calculation processing for each of sea areas to which the determined CPA belongs.

* * * * *